(12) United States Patent
Bristow et al.

(10) Patent No.: US 7,489,921 B2
(45) Date of Patent: Feb. 10, 2009

(54) SOFTWARE AND PROTOCOL STRUCTURE FOR AN AUTOMATED USER NOTIFICATION SYSTEM

(75) Inventors: Steven Bristow, San Francisco, CA (US); Richard Bentley, San Francisco, CA (US); Bruce Durham, Sunnyvale, CA (US); Gregory Delory, San Francisco, CA (US)

(73) Assignee: deCarta Inc., San Jose, CA (US)

( * ) Notice: Subject to any disclaimer, the term of this patent is extended or adjusted under 35 U.S.C. 154(b) by 718 days.

(21) Appl. No.: 11/034,675

(22) Filed: Jan. 13, 2005

(65) Prior Publication Data

US 2005/0197106 A1 Sep. 8, 2005

Related U.S. Application Data

(62) Division of application No. 09/837,738, filed on Apr. 16, 2001, now Pat. No. 7,310,509.

(60) Provisional application No. 60/198,112, filed on Apr. 17, 2000.

(51) Int. Cl.
*H04Q 7/20* (2006.01)
(52) U.S. Cl. .................................................. 455/412.2
(58) Field of Classification Search ................. 455/405, 455/410, 457, 346, 404.1, 38.4, 425, 466, 455/517, 345, 456.1, 456.2, 403, 456.3, 456.4, 455/551, 419, 552, 444, 426.1; 370/389, 370/465; 340/825.49, 539.18, 539.1, 525.49
See application file for complete search history.

(56) References Cited

U.S. PATENT DOCUMENTS

| | | | |
|---|---|---|---|
| 4,584,569 A | 4/1986 | Lopez et al. | |
| 4,774,658 A | * | 9/1988 | Lewin .................... 340/825.49 |
| 4,794,368 A | | 12/1988 | Grossheim et al. |
| 4,897,630 A | | 1/1990 | Nykerk |
| 4,987,402 A | | 1/1991 | Nykerk |
| 5,117,217 A | | 5/1992 | Nykerk |
| 5,193,141 A | | 3/1993 | Zwern |
| 5,223,844 A | | 6/1993 | Mansell et al. |
| 5,245,694 A | | 9/1993 | Zwern |

(Continued)

OTHER PUBLICATIONS

"Where in the World . . . , Part 1: GPS Introduction", Circuit Cellar (Aug. 1999).

(Continued)

*Primary Examiner*—Melody Mehrpour
(74) *Attorney, Agent, or Firm*—Fenwick & West LLP

(57) ABSTRACT

The present invention provides an automated user notification system for monitoring user items and notifying a user when selected conditions occur. A first portion of the notification system comprises a network operations center (NOC). The NOC stores user information about one or more user items and is further coupled to a plurality of communication devices that can automatically contact a user. A second portion of the notification system comprises at least one detector. The detector monitors one or more user items and provides efficiently encoded information regarding selected conditions of the user items to the NOC via a communication link. After the information is received and decoded by the NOC, the NOC automatically matches the received information to information stored at the NOC to determine if a condition exists about which the user should be notified.

42 Claims, 19 Drawing Sheets

U.S. PATENT DOCUMENTS

| | | | |
|---|---|---|---|
| 5,315,285 A | 5/1994 | Nykerk | |
| 5,357,560 A | 10/1994 | Nykerk | |
| 5,513,111 A | 4/1996 | Wortham | |
| 5,532,670 A | 7/1996 | Issa et al. | |
| 5,534,845 A | 7/1996 | Issa et al. | |
| 5,557,254 A | 9/1996 | Johnson et al. | |
| 5,596,313 A * | 1/1997 | Berglund et al. | 340/574 |
| 5,629,678 A | 5/1997 | Gargano et al. | |
| 5,646,591 A | 7/1997 | Issa et al. | |
| 5,656,997 A | 8/1997 | Hays et al. | |
| 5,704,008 A | 12/1997 | Duval, Jr. | |
| 5,712,638 A | 1/1998 | Issa | |
| 5,732,074 A | 3/1998 | Spaur et al. | |
| 5,734,981 A | 3/1998 | Kennedy, III et al. | |
| 5,742,666 A | 4/1998 | Alpert | |
| 5,771,455 A | 6/1998 | Kennedy, III et al. | |
| 5,783,989 A | 7/1998 | Issa et al. | |
| 5,798,711 A | 8/1998 | Issa et al. | |
| 5,805,670 A | 9/1998 | Pons et al. | |
| 5,826,195 A | 10/1998 | Westerlage et al. | |
| 5,832,394 A | 11/1998 | Wortham | |
| 5,850,352 A | 12/1998 | Moezzi et al. | |
| 5,857,967 A | 1/1999 | Frid et al. | |
| 5,872,519 A | 2/1999 | Issa et al. | |
| 5,873,043 A | 2/1999 | Comer | |
| 5,874,889 A | 2/1999 | Higdon et al. | |
| 5,889,474 A | 3/1999 | LaDue | |
| 5,898,391 A | 4/1999 | Jefferies et al. | |
| 5,900,806 A | 5/1999 | Issa et al. | |
| 5,907,195 A | 5/1999 | Issa et al. | |
| 5,908,383 A | 6/1999 | Brynjestad | |
| 5,917,405 A * | 6/1999 | Joao | 340/426.17 |
| 6,044,265 A | 3/2000 | Roachl | |
| 6,157,825 A | 12/2000 | Frederick | |
| 6,236,332 B1 | 5/2001 | Conkright et al. | |
| 6,281,790 B1 | 8/2001 | Kimmel et al. | |
| 6,285,868 B1 | 9/2001 | LaDue | |
| 6,295,346 B1 | 9/2001 | Markowitz et al. | |
| 6,317,639 B1 | 11/2001 | Hansen | |
| 6,542,730 B1 | 4/2003 | Hosain | |
| 6,556,840 B2 | 4/2003 | Zicker et al. | |
| 6,594,576 B2 | 7/2003 | Fan et al. | |
| 6,718,177 B1 | 4/2004 | Comer et al. | |
| 6,912,545 B1 * | 6/2005 | Lundy et al. | 707/104.1 |
| 2004/0014478 A1 | 1/2004 | Hoffman | |

OTHER PUBLICATIONS

CUE Corporation—Nationwide Wireless Messaging—Information Services [online], [retrieved on 2—04-10]. Retrieved from the Internet (URL: http://cue.net).

Vetronix Corporation [online], [retrieved on Apr. 10, 2000]. Retrieved from the Internet (URL:http://vetronix.com).

Skylemetry Wireless Data System [online], [retrieved on Apr. 10, 2000]. Retrived from the Internet (URL: http://www.bullhornsys.com).

Cellemetry [online], [retrieved on Apr. 19, 2000]. Retrieved from the Internet (URL:http://cellemetry.com.

OBD II [online], retrieved on Jun. 15, 1999]. Retrieved from the Internet (URL:http://obd-ii.com/background.html).

Hewett, Dennis, "Caller-Id Alarm System," Jan. 2000, Poptronics, pp. 15-22.

Article entitled "Phone a Coke," Electronics/Communications section of Popular Science, Oct. 1999 (1 page).

Datasheet entitled CompuTractor—Tractor Unit Asset Location System, 1998 CompuTracker Corporation (2 pages).

OnStar. Automatic Notification of Air Bag Deployment [online], retrieved on Jun. 15, 1999. Retrieved from the Internet (URL:http://onstar.com/action/airbag.htm).

OnStar. OnStar in Action [online], retrieved on Jun. 15, 1999. Retrieved from the Internet (URL:http://http/www.onsar.com/action/index.htm).

OnStar. Remote Door Unlock [online], retrieved on Jun. 15, 1999. Retrieved from the Internet. (URL:http://http/www.onstar.com/action/unlock.htm).

OnStar. Theft Protection [online], retrieved on Jun. 15, 1999. Retrieved from the Internet (URL:http://onstar.com/action/theft.htm).

OnStar Emergency Services [online], retrieved on May 15, 1999. Retrieved from the Internet (URL:http://onstar/com/action/emergency.htm).

Internet Resources Group, Enhanced Services [online], retrieved on Oct. 26, 1999. Retrieved from the Internet (URL:http://www.redalert.com/enhanced.services.html).

Internet Resources Group. Error Logs [online], retrieved on Oct. 26, 1999. Retrieved from Internet (URL:http://www.redalert.com/error_logs.html).

Internet Resources Group. Error Conditions Detected [online], retrieved on Oct. 26, 1999. Retrieved from the Internet (URL:http://www.redalert.com/error_conditions.html).

Internet Resources Group. Daily Monitoring Summaries [online] retrieved on Oct. 26, 1999. Retrieved from the Internet (URL:http://www.redalert.com/daily_monitoring_summaries.html).

Internet Resources Group. Error Notification [online], retrieved on Oct. 26, 1999. Retrieved from the Internet (URL:http://www.redalert.com/error_notification.html).

Internet Resources Group. Internet Device Monitoring [online], retrieved on Oct. 26, 1999. Retrieved from the Internet (URL:http://www.redalert.com/internet_device_monitoring.html).

Teletrac. Teletracer Stolen Vehicle Recovery and Mobile Information System [online], retrieved on Mar. 17, 1999. Retrieved from the Internet (URL:http://www.teletrac-online.com/products/htm/telescr.htm).

ATX Technologies, Inc. Emergency Services [online], retrieved Apr. 17, 1999. Retrieved from the Internet (URL:http://www.atxtechnologies.com/vehicle/engcysvc.sap).

* cited by examiner

| ID NUMBER | Condition |
|---|---|
| 0 | Doors Lock/Unlocked |
| 1 | Windows Up/Down |
| 2 | Alarm Arm/Disarm |
| 3 | Sunroof Open/Close |
| 4 | Trunk Open/Close |
| 5 | Lights On/Off |
| 6 | Horn On/Off |
| 7 | Engine |
| 8 | Ignition |
| 9 | GPS Tracking |

FIG. 7

| Interface Type | Device |
| --- | --- |
| Serial Port | IDB (Doors Lock/Unlocked) |
| Serial Port | IDB (Windows Up/Down) |
| Twist Pair | Alarm Arm/Disarm |
| Serial Port | IDB (Sunroof Open/Close) |
| Serial Port | IDB (Trunk Open/Close) |
| Serial Port | IDB (Lights On/Off) |
| Twist Pair | Horn On/Off |
| Serial Port | OBD (Engine) |
| Serial Port | OBD (Ignition) |
| Parallel Port | GPS Tracking |
| Twist Pair | Misc. |

IDB = Intelligent Data Bus (Devices Available)
OBD = On Board Diagnostic (Engine Functions)

FIG. 8

Televoke Login Page

TELEVOKE

*900*

Welcome to televoke.net

Device ID#: [_____] ⊢—*902*
Passcode: [_____] ⊢—*904*

ENTER

How to get Televoke?
Support

Copyright © 1999 Televoke, Inc. All Rights Reserved.

Note: this is a non-public website and is protected by password security. All content at www.televoke.net and its sub directories is prpprietary and confidential

*FIG. 9A*

Televoke Notification

| TELEVOKE | Device ID Number | 12345678 (BMW) ▼ | Your Device is Currently | ☐ In Range ☐ Out of Range | Logo |

( News ) ( Notification ) ( Control ) ( Tracking ) ( Billing ) ( Upgrade ) ( Support )

Zone: 1 (motion detector) ▼

912 —    914 —    916 —

Device
☑ Phone... ▼

Phone Number
(415) 778-0138

Message
Rick Bentley's BMW M3 reports doors ▲▼ test
save

Device
☑ Pager... ▼

Pager Number

Numeric Message
(415) 555-1234 ▲▼ test
save

Device
☑ E-mail... ▼

E-mail Address

Body
The doors on Rick Bentley's M3 have ▲▼ test
save

*910*

[News] [Notification] [Control] [Tracking] [Billing] [Upgrade] [Support]

Copyright © 1999 Televoke, Inc. All Rights Reserved.

*FIG. 9B*

Televoke Control Page

| TELEVOKE | Device ID Number | 12345678 (BMW) ▼ | Your Device is Currently | ☐ In Range<br>☐ Out of Range | Logo |

( News ) ( Notification ) ( Control ) ( Tracking ) ( Billing ) ( Upgrade ) ( Support )

CONTROL PAGE

Your vehicle has the following control capabilities
to add more go to the upgrade page

920

922

1    Lock/Unlock Doors    (Unlock Now!)

2    Arm/Disarm Alarm    (ARM Now!)

924

3    Windows Up/Down    (Up Now!)

4    Lights & Horn    (Click to Upgrade)

5    Start Motor    (Click to Upgrade)

[News] [Notification] [Control] [Tracking] [Billing] [Upgrade] [Support]

Copyright © 1999 Televoke, Inc. All Rights Reserved.

*FIG. 9C*

Televoke News and Events Page

TELEVOKE | Device ID Number: 12345678 (BMW) ▼ | Your Device is Currently: ☐ In Range ☐ Out of Range | Logo

[ News ] [ Notification ] [ Control ] [ Tracking ] [ Billing ] [ Upgrade ] [ Support ]

BILLING PAGE

Activity for the current billing period starting on 4/1/99. Click here for previous billing records
*940*

| *942* Event# | *944* Type | *946* Date | *948* Time Action | *950* Charges |
|---|---|---|---|---|
| 162 | Notification | 4/01/99 | 11:42pm called: (415) 555-1234 | N/A |
| 163 | Notification | 4/01/99 | 11:42 paged: (415) 555-4321 | N/A |
| 164 | Notification | 4/01/99 | 11:42pm e-mail: rick@televoke.com | N/A |
| 165 | Control | 4/05/99 | 2:30pm unlock doors | N/A |
| 166 | Tracking | 4/12/99 | 6:45pm web location | N/A |
| 167 | Control | 4/17/99 | 6:13pm unlock doors | $0.50 |
| 168 | Notification | 4/20/99 | 10:49pm called: (415) 555-1234 | $0.50 |
| 169 | Notification | 4/20/99 | 10:49pm paged: (415) 555-4321 | $0.50 |
| 170 | Notification | 4/20/99 | 10:49pm e-mailed: rick@televoke.com | $0.50 |

Your current plan includes 5 free events per month. To upgrade your plan for more included events, or more features click on UPGRADE.

[News] [Notification] [Control] [Tracking] [Billing] [Upgrade] [Support]

Copyright © 1999 Televoke, Inc. All Rights Reserved.

*FIG. 9E*

Table 1 Downstream Message Codes

| Function | Message Name | Code |
|---|---|---|
| Account Maintenance | D_Activate_Account | WC1 |
| Account Maintenance | D_Deactivate_Account | WC2 |
| Remote Vehicle Tracking | D_Get_Last_Known_Position | 1 |
| Remote Vehicle Tracking | D_Get_Last_8_Pos_5_min | WC3 |
| Remote Vehicle Tracking | D_Get_Last_8_Pos_1_hour | WC4 |
| Remote Vehicle Tracking | D_Get_Last_8_Stops | WC5 |
| Remote Vehicle Control (G4 Systems Only) | D_Arm_and_Lock | 2 |
| Remote Vehicle Control (G4 Systems Only) | D_Disarm_and_Unlock | 3 |
| Remote Vehicle Control (G4 Systems Only) | D_Activate_Output_A | 4 |
| Remote Vehicle Control (G4 Systems Only) | D_Activate_Output_B | 5 |
| Remote Vehicle Control (G4 Systems Only) | D_Activate_Output_C | 6 |
| Remote Vehicle Control (G4 Systems Only) | D_Disable_Sensor_A | WC6 |
| Remote Vehicle Control (G4 Systems Only) | D_Enable_Sensor_A | WC7 |
| Remote Vehicle Control (G4 Systems Only) | D_Disable_Sensor_B | WC8 |
| Remote Vehicle Control (G4 Systems Only) | D_Enable_Sensor_B | WC9 |
| Remote Vehicle Control (G4 Systems Only) | D_Disable_Sensor_C | WC10 |
| Remote Vehicle Control (G4 Systems Only) | D_Enable_Sensor_C | WC11 |
| Emergency Button and Impact Sensor Response | D_Received_and_Dispatched | 7 |

FIG. 10

Table 2 upstream Microburst Data Format

| Digit | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Content | MSD | LSD | Dir | $D_1$ | $D_2$ | $M_1$ | $M_2$ | $M_3$ | $M_4$ | $D_1$ | $D_2$ | $M_1$ | $M_2$ | $M_3$ | $M_4$ |
| | Alarm Event and Speed | | Direction | Longitude position offset data. Format: $D_1 D_2 M_1 M_2 M_3 M_4$ | | | | | | Latitude position offset data. Format: $D_1 D_2 M_1 M_2 M_3 M_4$ | | | | | |

FIG. 12

Table 3 Direction Code Map

| Code | A | 1 | 2 | 3 | 4 | 5 | 6 | 7 | 8 |
|---|---|---|---|---|---|---|---|---|---|
| Meaning | N | NE | E | SE | S | SW | W | NW | Stopped* |

*When vehicle is stopped, direction is not defined.

FIG. 13

Table 4 Upstream Message Codes

| Reference Section(s) | Message name | Alarm event and Speed Code | | | |
|---|---|---|---|---|---|
| | | SP1* | SP2 | SP3 | SP4 |
| Remote Vehicle Tracking Alarm Event Notification Configuration (G4 Systems Only) Reference Section(s) | U_Sensor_A | 00 | 25 | 50 | 75 |
| Remote Vehicle Tracking Alarm Event Notification Configuration (G4 Systems Only) Reference Section(s) | U_Sensor_B | 01 | 26 | 51 | 76 |
| Remote Vehicle Tracking Alarm Event Notification Configuration (G4 Systems Only) Reference Section(s) | U_Sensor_C | 02 | 27 | 52 | 77 |
| Remote Vehicle Tracking Alarm Event Notification Configuration (G4 Systems Only) Reference Section(s) | U_Door_Trigger | 03 | 28 | 53 | 78 |
| Remote Vehicle Tracking Alarm Event Notification Configuration (G4 Systems Only) Reference Section(s) | U_Trunk_Trigger | 04 | 29 | 54 | 79 |
| Remote Vehicle Tracking Alarm Event Notification Configuration (G4 Systems Only) Reference Section(s) | U_Hood_Trigger | 05 | 30 | 55 | 80 |
| Remote Vehicle Tracking Alarm Event Notification Configuration (G4 Systems Only) Reference Section(s) | U_Ignition_Sensor | 06 | 31 | 56 | 81 |
| Remote Vehicle Tracking Alarm Event Notification Configuration (G4 Systems Only) Reference Section(s) | U_3_Invalid_Valet_Codes | 07 | 32 | 57 | 82 |
| Remote Vehicle Tracking Alarm Event Notification Configuration (G4 Systems Only) Reference Section(s) | U_BlackJax_Activation | 08 | 33 | 58 | 83 |
| Remote Vehicle Tracking Alarm Event Notification Configuration (G4 Systems Only) Reference Section(s) | U_System_OK | 09 | 34 | 59 | 84 |
| Remote Vehicle Tracking Alarm Event Notification Configuration (G4 Systems Only) Reference Section(s) | U_Alarm_Reset | 10 | 35 | 60 | 85 |
| Remote Vehicle Tracking** | U_5_Min_Pos | 11 | 36 | 61 | 86 |
| Remote Vehicle Tracking** | U_1_Hour_Pos | 12 | 37 | 62 | 87 |
| Remote Vehicle Tracking** | U_Last_8_Stops_Pos | 13 | 38 | 63 | 88 |
| Remote Vehicle Tracking** | U_Stops_1_6_Time | 14 | 39 | 64 | 89 |
| Remote Vehicle Tracking** | U_Stops_7_8_Time | 15 | 40 | 65 | 90 |
| Emergency Button and Impact Sensor Response | U_Button_911 | 16 | 41 | 66 | 91 |
| Emergency Button and Impact Sensor Response | U_Button_Roadside | 17 | 42 | 67 | 92 |
| Emergency Button and Impact Sensor Response | U_Button_Medical | 18 | 43 | 68 | 93 |
| Remote Vehicle Control (G4 Systems Only)*** | U_Command_ACK | 19 | 44 | 69 | 94 |

*SP1 = 6-25 MPH; SP2 = 26-50 MPH; SP3 = 51-75 MPH; SP4 = >76 MPH
**Detail of these messages is defined in referenced document Clifford Vehicle Tracking Payload Protocol and Format
***Substitute ACK code (1 = received and handled, 2 = received and could not execute) for digit 3, digit 4 & 5 command code received per Table 1

*FIG. 14*

SOFTWARE AND PROTOCOL STRUCTURE FOR AN AUTOMATED USER NOTIFICATION SYSTEM

CROSS-REFERENCES TO RELATED APPLICATIONS

This application is a divisional of U.S. application Ser. No. 09/837,738, filed Apr. 16, 2001, now U.S. Pat. No. 7,310,509 priority which is claimed under 35 U.S.C. §120, which claims priority under 35 U.S.C. §119 to U.S. Provisional Application No. 60/198,112, filed Apr. 17, 2000, the disclosure of which are incorporated herein by reference as if set forth in full.

FIELD OF THE INVENTION

This invention relates generally to notification systems, and more particularly to software and a protocol structure for an automated monitoring system.

BACKGROUND OF THE INVENTION

A user can subscribe to a centralized monitoring service, such as a home security service, to assist with the monitoring and/or operation of the user's property. These services typically install and program security devices and have a centralized office, staffed around the clock, to monitor system operation. When a critical situation occurs, such as a burglary, the office staff can detect it and take action to contact the home owner.

However, monitoring services are expensive and can't provide all the flexibility and responsiveness users are looking for. For example, if the homeowner knows of a temporary condition that may provide false information to the service, such as a broken window, it can be difficult to update centralized services with this information. This situation could lead to false alarms because basic operating information is incorrect or there exists some confusion among the security staff. Additionally, it may be inconvenient or difficult for homeowners to update the service with frequently changing contact information. As a result, even if proper detection of an alarm condition occurs, the homeowner cannot be located.

Another problem with centralized monitoring services is that the employees of the service sometimes make mistakes. False alarms can occur when an employee misinterprets information provided by the system. Missed alarm conditions can occur if employees fail to properly monitor the system. Even when alarm conditions are properly detected, an employee may be slow to respond or may otherwise fail to take appropriate action. Thus, existing monitoring services can be unreliable, miss alarm conditions, detect false alarms, fail to notify users and can be difficult to update with the most recent operating information. As a result, people would greatly benefit from improvements in notification systems which can overcome the above problems and provide additional user controllable functionality.

One area where it would be desirable to have improved user notification and control is in vehicle monitoring systems. Motor vehicles are attractive targets for theft and vandalism due to their high value and inherent mobility. The development of motor vehicles has been paralleled by the development of alarm systems to protect them. These alarm systems range from simple steering wheel locks to more sophisticated electronic alarm systems. Typically, vehicle alarms try to prevent unauthorized access to the vehicle or removal of the vehicle without the owner's permission.

A major drawback of many vehicle alarm systems is that the owner may not be alerted to a possible theft until the vehicle has already been taken. Some audible alarm systems provide intrusion alerts to the area immediately surrounding the vehicle, but the vehicle owner may not be near enough to hear such alerts. In addition, the general public has become so accustomed to hearing these warning sounds that the warnings have lost their effectiveness to deter theft.

Just as in home security systems, expensive centralized services to provide vehicle security are available. In one such service, the owner may report that a vehicle was stolen, at which point the service activates a location device in an attempt to locate the stolen vehicle. However, the service activation doesn't occur until the owner reports the vehicle as stolen, thereby failing to provide real-time monitoring and control capability.

Although notification services for monitoring user items such as homes and cars provide improvements over simple audible alarms, they are subject to significant limitations. For example, all the problems discussed above (such as information updating, operator errors and user interface problems) exist with current notification services. The most significant drawback is that notification services have human operators who may be slow and prone to make errors. For example, a monitoring staff employee may be required to look up customer information and manually call any one of several telephone numbers, e.g., a home number, work number, cell phone number or pager number to contact the customer. This task may require several minutes to carry out. In the meantime, a vehicle may be stolen or a home may be vandalized. In an emergency situation, such a delay is not tolerable. Moreover, a staffed operations center creates a significant cost factor, in part because office employees are needed around the clock. This situation does not exhibit a positive economy of scale when required to service an increasingly larger customer base.

All these factors combine to show that employee staffed notification services cannot provide a low cost and effective monitoring, notification and control system for a large number of users. What is needed is a low-cost, fully automated notification and control system for providing information about user items such as vehicles, homes or office spaces. The automated system should allow a user to specify which events or conditions are to be monitored. Indications of the specified conditions should be automatically detected and notification sent to the user without using services performed by human operators. A variety of notification devices, such as telephone, facsimile, pager and email should be available to allow users flexibility when using the system. There should also be user access to the system that allows the user to control and update monitored events, alarm conditions, user notification devices, and contact information.

In addition, an automated system must be able to optimize the amount of information which can be transmitted within a short time and within the constraints of the applicable data protocol. Considering the example of a vehicle-based system, a user will want to know when a break-in has occurred and possibly other information regarding the break-in, such as whether the vehicle is being moved, the location and speed of the vehicle, etc. The in-vehicle apparatus may have a limited amount of time within which to transmit these data before the thief disables the apparatus. Moreover, the data packets transmitted by the in-vehicle apparatus will have a limited number of bytes or digits within which all of the notification information must be encoded.

SUMMARY OF THE INVENTION

The present invention provides an automated user notification system for monitoring user items and notifying a user when selected conditions occur. A first portion of the notification system comprises a network operations center (NOC). The NOC stores user information about one or more user items and is further coupled to a plurality of communication devices that can automatically contact a user. A second portion of the notification system comprises at least one detector. The detector monitors one or more user items and provides information regarding selected conditions of the user items to the NOC in the form of efficiently encoded data packets transmitted over a communication link. When the data packets are received and decoded by the NOC, the NOC automatically matches the received information to information stored at the NOC to determine if a condition exists about which the user should be automatically notified.

In one embodiment of the invention, a user notification system is provided for automatically providing information to a user regarding a user item. The user notification system comprises a detection module coupled to the user item to determine information about the user item. A first communication module, coupled to the detection module, includes logic for efficiently encoding a data packet and sending the data packet over a communication link. The data packet is received by a second communication module that includes logic for decoding the data packet and determining whether a condition exists about which the user should be notified. A processor coupled to the second communication module is coupled to at least one user notification device.

In other embodiments of the invention, the user notification system comprises a vehicle alarm system. The vehicle alarm system detects intrusion or attempted burglary of the vehicle, efficiently encodes a data packet indicating a problem code, a location code and other information, and sends the data packet over a communication link. A network operations center ("NOC") decodes the data packets sent from the vehicle and notifies the user about the cause of alarm actuation, vehicle location and other vehicle parameters. Some embodiments allow the user to receive customized notifications from the vehicle. In addition, some embodiments enable the owner to remotely control the vehicle by arming or disarming the vehicle alarm, locking or unlocking the vehicle doors, starting or stopping the vehicle engine, etc., in response to the notifications.

Some embodiments of the invention comprise a home alarm system that detects emergency conditions, intrusion or burglary of a user's home. The home alarm system encodes a data packet indicating the status of such selected conditions and transmits the data packet to an NOC, which decodes the data packet and causes the user to be notified. For example, the status of door sensors, window sensors, smoke detectors, fire and flood sensors are detected and any abnormal condition is encoded in a data packet, transmitted to the NOC and decoded. The NOC immediately notifies the home owner regarding the abnormal condition. The system enables the owner to receive status information about any monitored condition through a variety of interfaces, such as the telephone or the Internet. In addition, the system enables the owner to remotely arm or disarm selected alarm conditions, and active or deactivate home systems such as heating or hot water systems.

Other embodiments of the present invention describe methods for providing status data regarding a user item. Generally speaking, these methods include the steps of: (1) obtaining a first type of status data, a second type of status data and a third type of status data; (2) encoding the first type of status data in a first data field of a data packet (which may be a fixed-length data packet); (3) encoding the second type of status data and the third type of status data in a second data field of the fixed-length data packet; and (4) transmitting the data packet. Some embodiments describe a method for encoding the second and third types of data in a 1-byte field of the data packet.

BRIEF DESCRIPTION OF THE DRAWINGS

FIG. 7 is a list of detectable conditions in a vehicle monitoring embodiment of the present invention;

FIG. 8 shows an item database for use with a vehicle monitoring embodiment of the present invention; and FIGS. 9A-9E illustrate web pages available for user interaction via the Internet.

FIG. 10 is a table of exemplary downstream message codes.

FIG. 12 illustrates an upstream message code format.

FIG. 13 a table of exemplary direction codes.

FIG. 14 is table of exemplary upstream message codes.

DESCRIPTION OF THE SPECIFIC EMBODIMENTS

Figure 1:
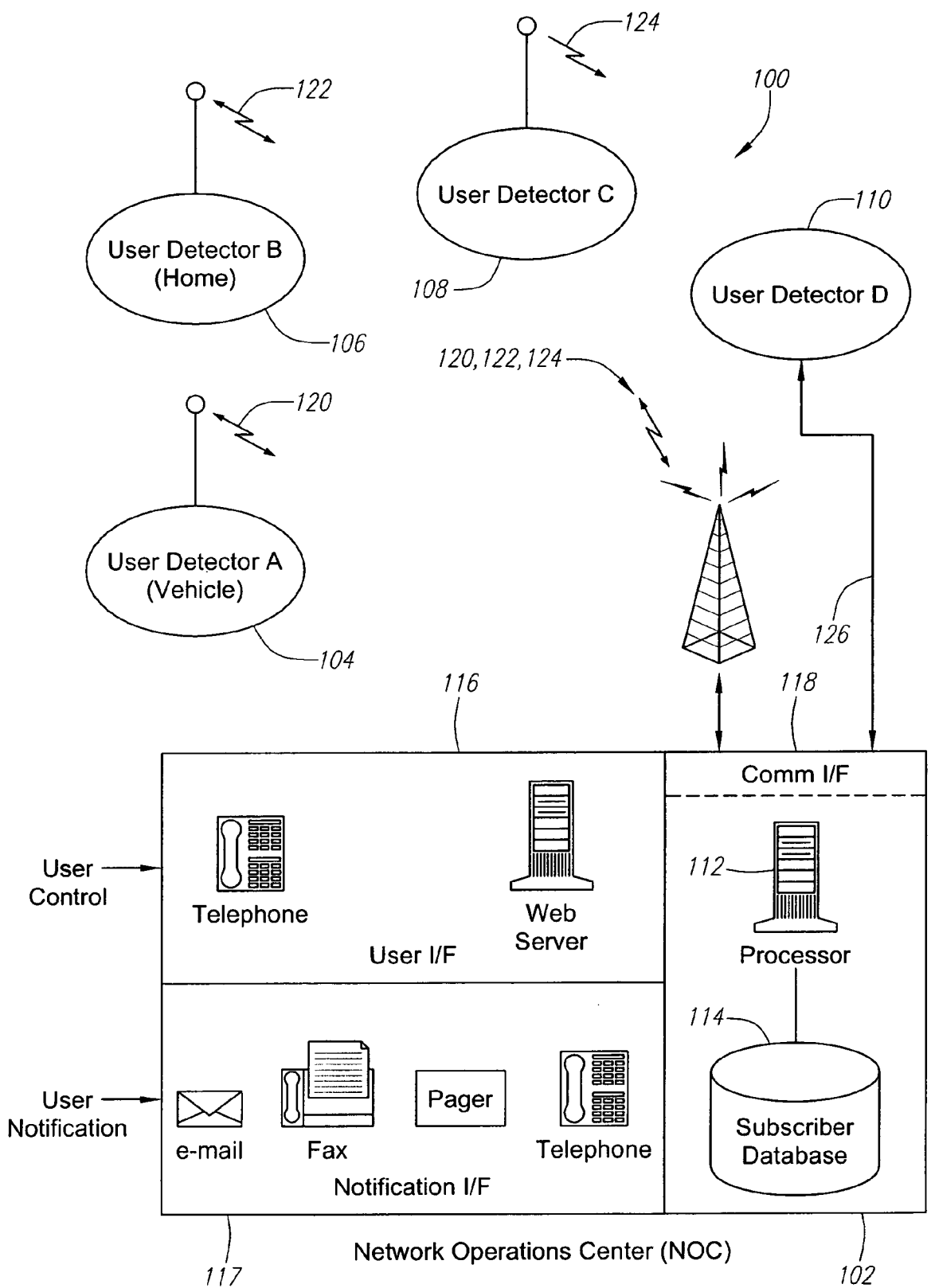
FIG. 1 is a diagram of an embodiment of an automated user notification system 100 in accordance with the present invention.

FIG. 1 is a diagram of an embodiment of an automated user notification system 100 constructed in accordance with the present invention. User notification system 100 comprises network operations center (NOC) 102 and user detectors 104, 106, 108 and 110. NOC 102 comprises processor 112, subscriber database 114, user interface 116, notification interface 117 and communication interface 118.

NOC 102 uses communication interface 118 to communicate over communication channels 120, 122, 124 and 126 with user detectors 104, 106, 108 and 110, respectively. Communication channels 120, 122, 124 and 126 may comprise wireless or wired communication channels. For example, one or more of communication channels 120, 122, 124 and 126 may comprise a hardwired channel which directly connects a selected detector with NOC 102, such as shown by communication channel 126. Although communication channels 120, 122 and 126 depict bi-directional communication between their respective detectors and NOC 102, it is possible that a selected communication channel provides only oneway communication to accommodate less sophisticated detectors as illustrated by unidirectional communication channel 124.

The Aeris.net™ System

As noted, the present invention can utilize both wireless and wired communication channels. In one preferred embodiment, a remote system includes a microburst radio which transmits data packets over the Aeris Network, using Aeris.net's MicroBurst® technology. MicroBurst® technology is a proprietary utility that enables short data packets to be transmitted over control channels in cellular networks using standard IS-41B signaling mechanisms. These short data packets are routed to the Aeris central hub facility over existing SS#7 (Signaling System 7) networks. The Aeris hub identifies the service provider, the ultimate recipient for the data and routes the data for delivery via a back-end link, which includes Internet, dial-up and dedicated connectivity.

Aeris.net's MicroBurst® service uses an underutilized portion of standard cellular channels to send and receive small packets of data to and from specialized endpoint wireless devices, both fixed and mobile.

Each endpoint device contains a cellular transceiver that has been programmed with MicroBurst-specific firmware. Each device also contains sensors and processing capability that allow it to gather and encode the application data, transmit limited bit length messages (such as the standard 50-bit messages used in the MicroBurst® network) to the application host computer, and to decode and execute instructions received from the application host computer. MicroBurst® users can log on to a Web-based application to collect or view the data, or can receive notification by any other network-connected means, including portable phones or pagers. Users can also use the Web or other network connection to initiate particular functions on the endpoint devices.

The MicroBurst® network is made up of five basic component groups:

1. Cellular airlink and carrier, which provides wireless connectivity from the Aeris.net™ hub facility out to the MicroBurst® endpoint devices;

2. Signaling System 7 (SS7) network, which authenticates devices and transports IS-41 signals (including the MicroBurst® data packets) between Aeris.net's central hub facility and the cellular carrier switches;

3. Internet and dedicated TCP/IP data links provide transport for the data traffic between the Aeris.net hub and application host facilities, from which the endpoint devices are remotely monitored and controlled;

4. Aeris.net central hub facility, which provides the central processing functions for the MicroBurst® service; and 5. MicroBurst® compatible devices, which are application-specific telemetry units which include a cellular transceiver; a micro-controller with memory; MicroBurst-specific firmware; and sensors, as appropriate.

MicroBurst® service uses standard cellular control channels to transmit and receive data to and from MicroBurst® devices. There are two types of control channels: Forward Control Channels (FOCC), which operate from the cellular switch out to the MicroBurst® device, and the Reverse Control Channels (RECC), which operate from the MicroBurst® device back to the switch.

Messages sent on the FOCC are conventional paging messages that follow cellular standards. The FOCC messages are used to trigger specific events from the MicroBurst® device, such as data reports, state, or parameter changes at the MicroBurst® device. Some particular MicroBurst® devices can be provisioned with up to ten Mobile Identification Numbers ("MINs"), which are the cellular equivalents of landline telephone numbers, to allow for a number of different events to be triggered.

MicroBurst® devices send out "Remote Feature Access Requests" (MicroBurst data packets) using an RECC message and standard protocols according to EIA/TIA-553 and IS-95/IS-136 specifications. The data are encoded in the dialed digits field of a message as a Remote Feature Access Request.

This transmission is handled by the Mobile Switching Center (MSC) in the same way that any other control channel message is originated by a roamer mobile unit. According to IS-41 requirements, the airlink transmission generates an IS-41B message that is sent via the SS7 network to the Home Location Register (HLR) for the MIN of the mobile device. Because the MicroBurst® devices use uniquely assigned MINs, the MSC translation tables are set to send these messages to the Aeris.net™ HLR.

The Remote Feature Access Request is a message that tells the cellular switch to route a message through the SS7 network to Aeris.net's MicroBurst® systems for processing and delivery to a Commercial Service Provider (CSP).

The application data are embedded in the dialed digits field of the MicroBurst® data transmission along with a single leading "*" digit. The leading digit tells the switch to treat the message as a Remote Feature Access Request by a roamer cellular device. The switch then routes the MicroBurst® data packets to the IS-41 network using SS7 protocols for feature verification by Aeris.net's HLR.

All the required data are transmitted within the initial control channel data packet, so no further interaction with the mobile unit is necessary. After the initial control channel data packet, the mobile unit terminates the connection using standard EIA-553 and IS-95/IS-136 protocols.

After the MicroBurst® data packets are received at the Aeris.net™ hub, the MIN information in the data packet is examined to determine which device sent the information. The appropriate account is validated via the SS7 network to the origination point of the remote feature request.

The MIN, dialed digits and other data are then sent to a message router to determine the data's destination and to transmit the data to the appropriate Commercial Service Provider for processing. The message router and other devices log the data for billing and tracking purposes.

Other Communication Systems

Although the preferred embodiment of the present invention uses the Aeris.net™ system, one of skill in the art will appreciate that many alternative communication systems could be used to implement the present invention. For example, one embodiment of the present invention uses the control channel of the AMPS analog cellular phone system for the communication of data between the remote device and the NOC. Alternative wireless communication systems include the GSM cell phone system which supports SMS (i.e., short message service) for the bi-directional delivery of data; the Mobitex™ data message delivery system offered in the Ericson and Bell South systems; the Ricochet™ brand of data transceivers offered by Metricom; and other cellular systems supporting such formats as the CDPD standard of wireless messaging. Satellite based wireless systems such as the ORBCOM™ system by Orbital Sciences Corporation can also be used to link the remote device to the NOC. Wired communication channels include analog phone lines, ISDN phone lines, T1 phone lines, and DSL phone lines. An alternate to any of the public carrier systems is a private data network.

Notification interface 117 provides for programmable interaction with notification devices such as electronic mail (i.e., e-mail), facsimile, pager and standard telephone devices. The notification devices also include connections to public data networks, such as the Internet (not shown). NOC 102 uses the notification devices to notify users upon detection of specific conditions of user items.

User interface 116 provides telephone and Internet devices for use by users of automated system 100. User interface 116 allows users to access and control the operation of NOC 102. For example, a user may obtain status information about a user item or may enable and disable controllable features of the user item or automated system 100 by accessing the system through user interface 116.

Figure 2:
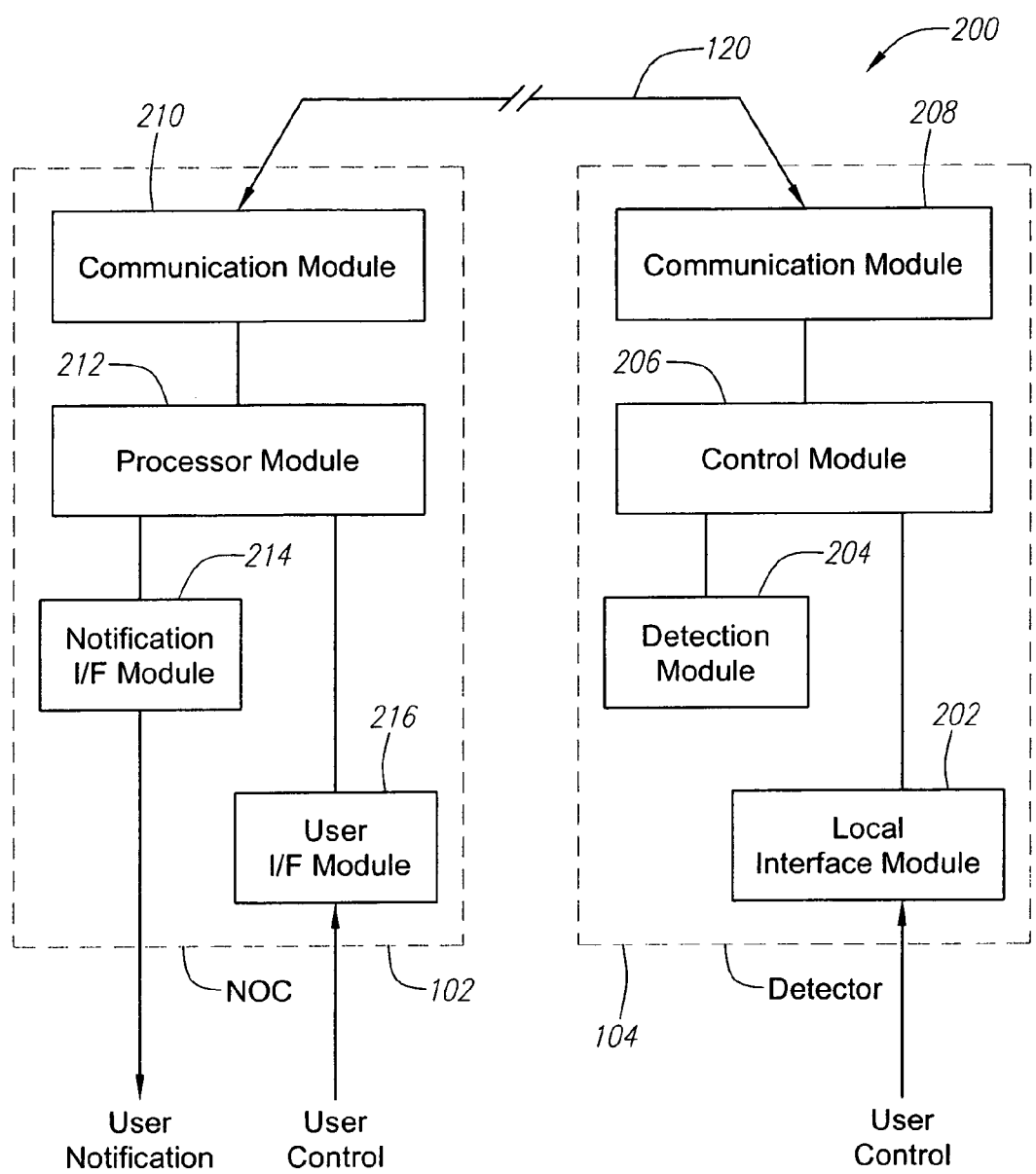
FIG. 2 is a functional block diagram of an operational portion of the user notification system of FIG. 1.

FIG. 2 shows a functional block diagram of an operational portion 200 of user notification system 100 constructed in accordance with the present invention. Operational portion 200 comprises NOC 102 and detector 104. Information flows between NOC 102 and detector 104 via communications link 120. In the preferred embodiment, communications link 120 comprises a wireless communications link to form a bi-directional communication channel between the NOC 102 and the detector 104. Wireless communication link 120 may comprise a cellular link, such as used in cellular phone technology, or may comprise any other type of wireless link.

Detector 104 couples to systems and operational elements of the user item to allow monitoring and control of selected conditions and functions applicable to that user item. Detector 104 adapts to couple directly to elements of the user item. For example, if the user item is a vehicle, one of the detected conditions can be the state of the vehicle's ignition switch. Detector 104 also adapts to couple to existing alarm system components. For example, if older or less sophisticated alarm system components are mounted to the user item, detector 104 adapts to couple to, and operate with, these components. This allows the present invention to utilize existing hardware to provide notification and control features that are unavailable in other systems.

Detector 104 comprises local interface module 202, detection module 204, control module 206 and communications module 208. The versatile design of detector 104 allows coupling to a variety of user items. For example, detector 104 may be coupled to a user vehicle, a home, office space or even personal items such as a personal computer.

Local interface module 202 is coupled to control module 206. Local interface module 202 comprises user I/O devices such as a keypad, a visual display, visual indicators and/or audible indicators (not shown). The user interacts with detector 104 by using the I/O devices. However, as will be discussed below, the user can also interact with detector 104 via NOC 102. By using the I/O devices, the user can manually input information to control the operation of detector 104, such as enabling or disabling monitoring functions. Local interface module 202 also provides a way for the user to remotely access functions of NOC 102 via communication link 120.

Detection module 204 is coupled to control module 206. Detection module 204 is also coupled to the user item (not shown) to detect a selected condition of the user item. For example, in a vehicle monitoring application, detection module 204 may detect the state of the vehicle's ignition switch, door locks, transmission or tachometer. Detection module 204 provides information about the detected conditions to control module 206. Detection module 204 may also couple to currently installed alarm system components of older and less sophisticated systems. This allows the present invention to utilize existing hardware, to reduce costs, while providing notification and control features previously unavailable.

Control module 206 is coupled to detection module 204, local interface module 202 and communication module 208. Control module 206 controls the overall operation of detector 104. Control module 206 uses parameters received from communications module 208 or local interface module 202 to perform various functions, such as configuring detector 104. Control module 206 receives conditions detected by detection module 206 and determines what action detector 104 should take. In one situation, control module 206 may simply transmit the detected conditions to NOC 102 via communications module 208. In another situation, control module 206 uses the detected conditions to control operation of the user item, such as disabling the vehicle's ignition switch. In this situation, local control of the user item occurs without interaction with NOC 102. More details concerning detected conditions in a vehicle monitoring embodiment are discussed below with reference to FIG. 7.

Communications module 208 is coupled to control module 206 and communications link 120. Communications module 208 comprises a transceiver (not shown) to transmit and receive information over communication link 120. Information received by communication module 208 over communication link 120 is directed to control module 206 for processing. Processed information from control module 206 is received by communications module 208 for transmission over communication link 120. To accommodate hardwired and wireless communication links, communications module 208 uses an appropriate transceiver (not shown). For example, if communication link 120 is a wireless link using cellular telephony technology, communication module 208 uses a cellular transceiver. Thus, communication module 208 adapts to operate with any type of link allowing information to flow between NOC 102 and detector 104.

NOC 102 comprises communications module 210, processor module 212, notification I/F module 214 and user I/F module 216. NOC 102 provides fully automated user notification based on a determination of selected conditions. The selected conditions may be conditions detected by detector 104 or may be conditions relating to the operation of NOC 102. Depending on the type of communication link used, NOC 102 may be located a great distances from detector 104 and still provide all the required functionality. For example, using a cellular transmission link, NOC 102 and detector 104 may be located virtually anywhere cellular service is available.

Communications module 210 is coupled to processor module 212 and communications link 120. Communication module 210 comprises a transceiver (not shown) that sends and receives transmissions over communications link 120. Communications module 210 of NOC 102 communicates with all the detectors, namely, 104, 106, 108 and 110, of notification system 100 regardless of the type of communication link used with each detector. For example, detector 104 uses a wireless communication link and detector 110 uses a hardwired communication link. Thus, communication module 210 provides the capability to communicate with a number of detectors utilizing different communication technologies.

Processor module 212 is coupled to communication module 210, notification I/F module 214 and user I/F module 216. Processor module 212 processes information received from detector 104 via communication module 210 to determine if user notification is required. Processor module 212 comprises a memory for pre-stored information relative to all the user items being monitored. Processor module 212 uses the pre-stored information to remotely program detectors, to control detector operation and to determine when automatic user notification is required by comparing or matching received information from the detectors to the pre-stored information. The memory also contains user contact information and system operating parameters.

Notification I/F module 214 is coupled to processor 212 and comprises a number of user notification devices (not shown). Based on instructions received from processor 212, notification I/F module 214 uses the notification devices to automatically notify the users of selected conditions regarding user items.

User I/F module 216 is coupled to processor module 212 and comprises interactive devices such as a standard telephone device or an Internet device (not shown). The telephone device allows users to interact with NOC 102 to provide user information and control. The Internet device has associated web pages that allow the user to interact with NOC 102 over an Internet connection. By using the interactive devices, the user can control operation of automated system 100, update contact information, change the status of detector modules, change the operating conditions of the user items being monitored or receive status information about specific user items. Interaction between the user and automated system 100 via user I/F module 216 is completely automated so that no human operator or customer service personnel are required. The interactive devices allow the user to remotely control selected functions of automated system 100 and the user item, such as remotely disabling an audible alarm or remotely locking the vehicle door locks. A more detailed description of the associated web pages is provided in a later section and with reference to FIGS. 9A-9E.

Figure 3:
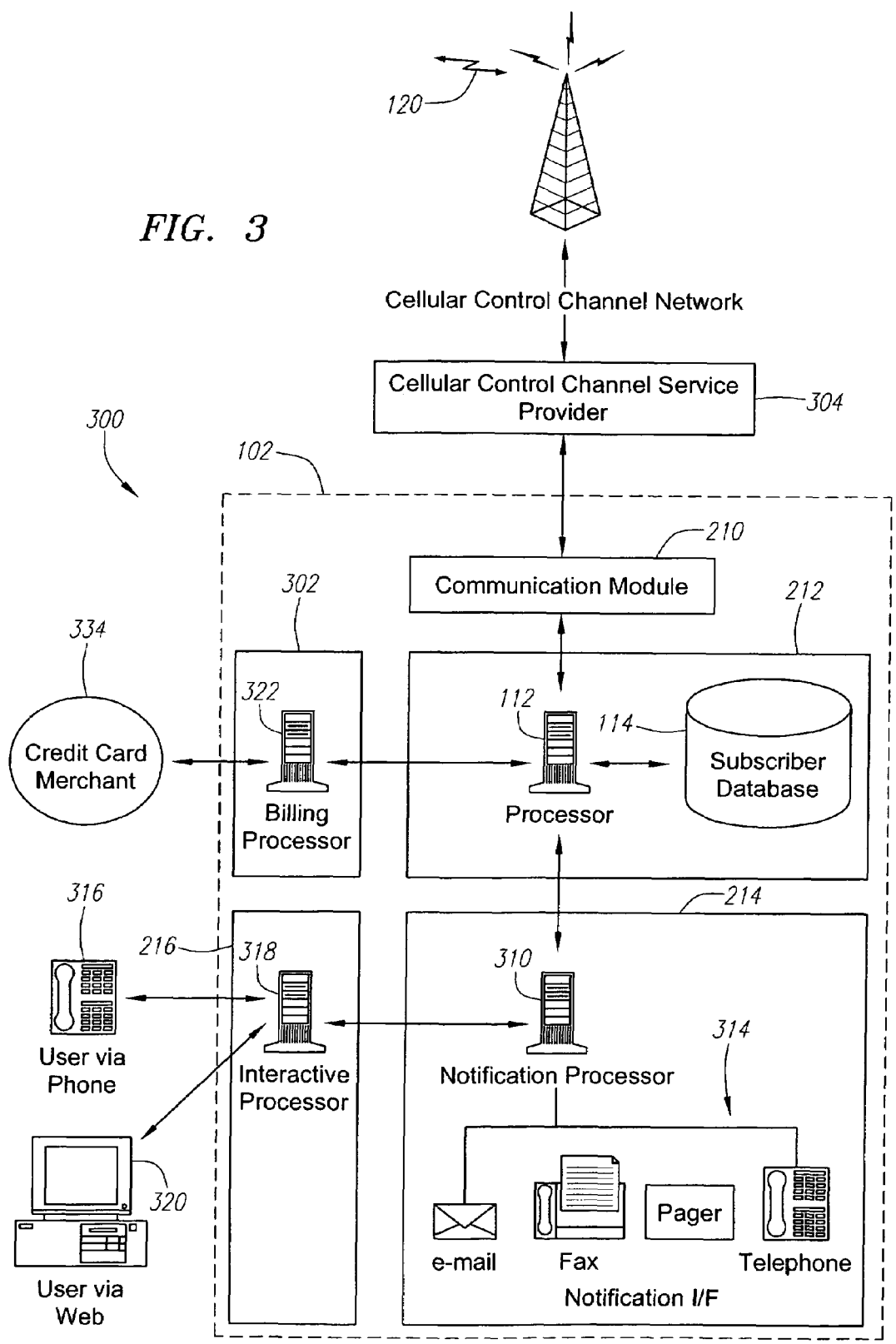
FIG. 3 is a detailed block diagram of the network operations center of FIG. 1.

FIG. 3 illustrates detailed diagram 300 of NOC 102. NOC 102 comprises communication module 210, processor module 212, notification I/F module 214 and user I/F module 216. Additionally, NOC 102 may comprise billing module 302. NOC 102 is coupled to cellular service provider 304, which provides the wireless communication link 120 to detector 104 (not shown). However, NOC 102 may be coupled to other types of wireless or hardwired service providers.

Processor module 212 comprises processor 112 and subscriber database 114. Subscriber database 114 stores information regarding user items, specific monitored conditions, user contact information and other operating parameters. Processor 112 receives information about the status of user items from communication module 210. Communication module 210 interfaces with cellular service provider 304 so that information flows between detector 104 (not shown) and NOC 102 using cellular link 120 provided by cellular service provider 304.

When processor 112 detects a specific condition about the user item, such as an alarm condition, processor 112 sends instructions to notification I/F module 214. The instructions alert notification module 214 to notify the user about an existing alarm condition. Notification module 214 comprises notification processor 310 coupled to a plurality of notification devices 314. User contact information is retrieved from subscriber database 114 and one or more of the notification devices are activated to contact the user.

Once the user has been contacted by notification I/F module 214, several courses of action are possible. The user may contact NOC 102 by telephone 316, wherein contact is made via user I/F module 216. User I/F module 216 comprises interactive processor 318 which forms an automated system to accept user queries and commands, so that the user may obtain additional information about the recent alarm condition or control features and functions of the system. Interactive processor 318 interfaces with processor 112 so that any information available about the status of the user item, stored at processor 112, may be retrieved by interactive processor 318 for access by the user. At any time, the user may contact NOC 102 via user I/F module 216 to control the operation of NOC 102 or update information parameters. For example, the user may call NOC 102 by telephone to interact with user I/F module 216 to enable monitoring of the user's vehicle. Alternatively, the use may contact NOC 102 via the Internet using the associated Web pages to control operation of the system or access information parameters.

After obtaining the status of the user item, the user may provide control instructions to NOC 102 as to how to handle the existing condition. For example, if the user item is a vehicle that has been placed in operation without the user's consent, the user may instruct NOC 102 to track the vehicle. Alternatively, the user may instruct NOC 102 to disable the vehicle or to activate the vehicle's audible alarm.

The user may also update information about the user item and/or the contact information via interactive processor 318. When user contact or user item information is changed, interactive processor 318 communicates the new information to subscriber database 114 via processor 112. Thus the user may interact with NOC 102 via an easy and convenient interface to provide control instructions, receive status information or change user parameters or contact information. Additionally, the user may contact interactive processor 318 via computer 320 connected to a public information network such as the Internet. All the capabilities of interactive processor 318 are available to computer 320 utilizing the public network connection.

As an option to NOC 102, billing module 302 includes billing processor 322 to bill the user for services provided by automated system 100. Billing may be based on usage, resource utilization, number of contacts in a given period or other measurable billing criteria. Billing processor 322 accesses user information on subscriber database 114 via processor 112. Billing may be accomplished in any convenient form. For example, credit card merchant process 334 may allow services to be billed to the user's credit card on a monthly basis.

Figure 4:
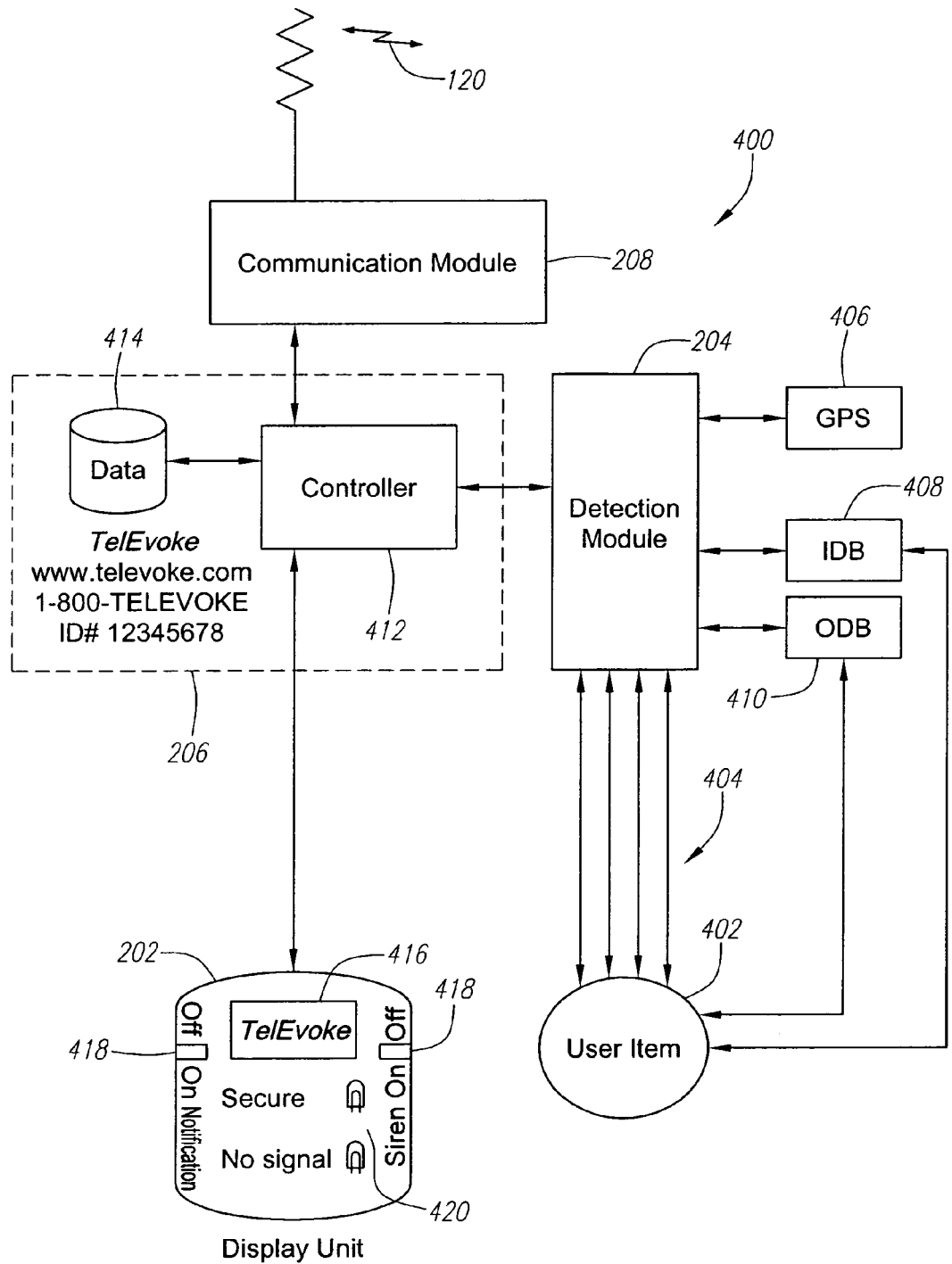
FIG. 4 is a detailed diagram of the detector of FIG. 1.

FIG. 4 illustrates a detailed diagram 400 of detector 104. Detector 104 comprises communication module 208, control module 206, detection module 204 and local interface module 202. Also shown in FIG. 4 a user item 402, which in FIG. 4 is a vehicle but could also be a home, office space or other user item.

Detection module 204 monitors selected parameters of user item 402. A set of detection lines 404 couple detection module 204 to user item 402 and provide information to detection module 204 about the selected parameters. For example, one of the selected parameters may be the state of the vehicle's ignition switch. When one of detection lines 404 is coupled to the ignition switch, detection module 204 is able to detect the ignition switch state.

In another method of obtaining information about a user vehicle, detection lines 404 connect to existing alarm system components (not shown) from older and less sophisticated alarm systems. These components may already monitor conditions of the user vehicle that are identical to requirements of the present invention. By utilizing existing detection components system costs are reduced while still providing the notification and control features of the present invention. For example, detection module 204 adapts to couple to an older system component that monitors the state of the vehicle's ignition switch. This eliminates the need for new detection hardware, thereby saving cost, while still providing the ignition switch information for processing by the present invention.

In another method of obtaining information about a user vehicle, detection lines 404 connect to Intelligent Data Bus (IDB) 408, which is installed in the vehicle. IDB 408 is a peer to peer data network available for use in automotive devices and other ground vehicles. IDB 408 has access to important vehicle systems, such as the vehicle's electrical system and components, and connecting to it provides detection module 204 with access to these systems.

In another method of obtaining information about a user vehicle, detection lines 404 connect to On-Board Diagnostic (OBD) system 410. OBD system 410 provides a means to control engine functions and diagnose engine problems. By connecting to OBD system 410, detection module 204 has access to such vehicle parameters as engine operating parameters, emission parameters, chassis and accessory devices.

In another method of obtaining information about a user vehicle, detection module 204 has plug-in serial and parallel ports to accept a variety of plug-in devices. By providing a wide range of detection interfaces, such as serial and parallel ports or twisted pair wiring, detection module 204 allows detector 104 to connect to, and detect conditions of, a user vehicle or virtually any user item.

In at least one embodiment of the invention, Global Positioning System (GPS) module 406 is coupled to detection module 204. The protocol for the information sent from the remote location to NOC 102 includes the GPS location coordinates received from the GPS receiver. Typically these coordinates are sent in a format using the National Marine Electronics Association or NMEA format.

Communication module 208 is coupled to control module 206 and comprises a transceiver (not shown) for transmitting and receiving information with NOC 102 over communication link 120. The transceiver may be a wireless transceiver that utilizes a radio communication link or the transceiver may be hardwired to NOC 102. The transceiver receives information from NOC 102 regarding parameters to be monitored, status information or other operating information. Communication module 208 sends the received information to control module 206 for further processing. Any information to be transmitted to NOC 102 by communication module 208 will be provided by control module 206.

Control module 206 couples to communication module 208, detector 204 and local interface module 202. Control module 206 comprises controller 412 and item database 414. Item database 414 contains information about the user item to be monitored, status information, operational parameters and other information for use by controller 412 to perform the functions of detector 104. A more detailed description of item database 414 is provided in a later section, with reference to FIG. 8.

Controller 412 receives information from NOC 102 via communication module 208 and responds by communicating with detection module 204 or local interface module 202. For example, NOC 102 may request that detector 104 provide a status of user item 402. In response, controller 412 obtains information about user item 402 from detection module 204, displays the information using local interface module 202 and transmits the information to NOC 102 via communication module 208. Thus, all manner of detection functions can be accomplished remotely by NOC 102. In another method of operation, controller 412 receives information from detection module 204, and in response, controller 412 commands detection module 204 to disable one or more of the user item's resources. This demonstrates local control of the user item by controller 412. In a similar fashion, instructions for control of the user item may also be received from NOC 102.

Local interface module 202 couples to control module 206 and may comprise text or graphic display 416, a keypad (not shown) or user operable switches 418 and indicator lights 420. Local interface module 202 provides the user a way to locally interact with detector 104, so that control of the user item and display of status information can be performed. Additionally, local interface module 202 allows the user to interact with NOC 102 by, for example, locally entering user item 402 parameters and transmitting the parameters via control module 206 and communication modules 208 to NOC 102.

Figure 5:
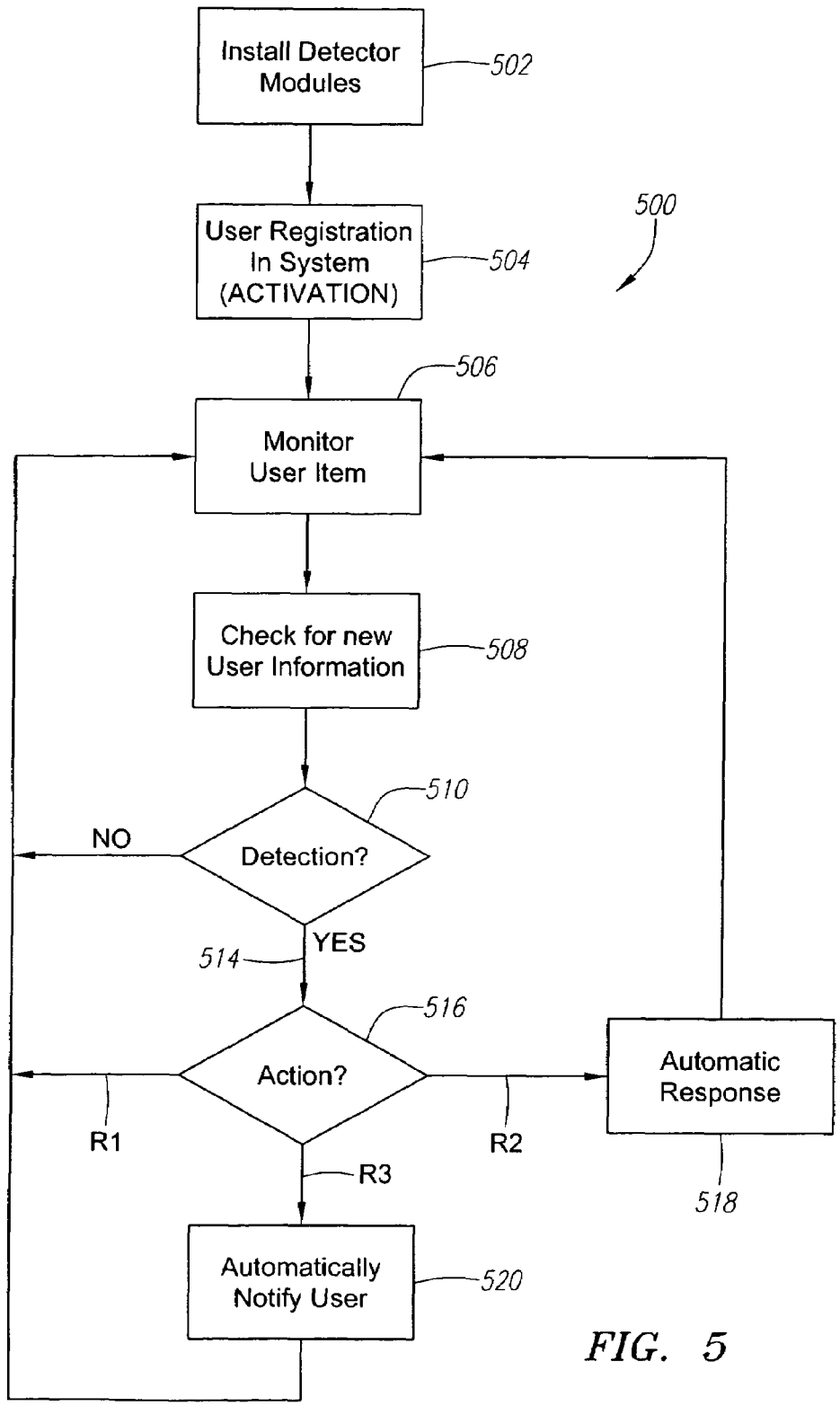
FIG. 5 is a flow diagram which shows a method of operating the automated user notification system of FIG. 1.

FIG. 5 shows a block diagram illustrating method of operation 500 of the embodiment of user notification system 100 illustrated in FIG. 1. Method 500 begins at block 502, wherein one or more detector modules are coupled to the user items to be monitored. The items to be monitored may be a user's vehicle, home, office or even smaller items such as a home computer or residential safe.

At block 504, a user registration process occurs wherein information about the user and the user items is input into database 114 of NOC 102. The information comprises detector parameters regarding the type of detectors used and how they are coupled to the user item, user parameters regarding the user items, and user contact information. Other information may be entered into database 114 to facilitate other functions, such as invoicing. After the registration process is completed, user notification system 100 is activated.

At block 506, user notification system 100 monitors the user items for one or more conditions as specified in the registration process. At block 508, the notification system routinely checks for new user information. For example, the user may activate or deactivate the monitoring process or may update user item status by providing new information concerning a user item, such as, a window is broken but the system is to ignore this condition. By periodically checking for new user information, notification system 100 adapts to changing conditions of either the user items or the user's requirements.

At block 510, notification system 100 checks for detection of selected monitored conditions of the user items. The detector may periodically transmit status information to NOC 102, or NOC 102 may periodically poll the detector to determine the status of the monitored conditions. If none of the monitored conditions exists, then operation of the system proceeds along path 512 to block 506 where monitoring of the user item continues. If a selected monitored condition exists, such as activation of the vehicle's ignition system, then operation of the system proceeds along path 514 to block 516, where the next action will be determined.

At block 516, the detected conditions are analyzed with regard to information in the database to determine what action notification system 100 will take. In response one (R1) no action is taken. This response may occur in situations such as in the broken window example above. In this situation the processing of notification system 100 returns to block 506 to continue to monitor the user items.

Another action that may be taken by notification system 100 is response two (R2). R2 is an automatic response to the detected condition. At block 518, the automatic response is determined. The automatic response may be something as simple as NOC 102 logging that the condition has occurred. Alternatively, the automatic response may entail NOC 102 directing detector 104 to take some other action, such as reporting to NOC 102 a current position of the user item. The automatic response may also comprise NOC 102 commanding detector 104 to take affirmative action, such as disabling the user item from further operation or activating an alarm indicator. At the completion of the automatic response R2, the operation of notification system 100 returns to block 506 to continue to monitor the user items.

Another action that may be taken by notification system 100 is response three (R3). R3 results in an automatic user notification in response to the detected condition. At block 520, the automatic user notification is performed. NOC 102 uses the information in database 114 to determine how to contact the user. Attempts to contact the user are made by using notification devices 314 of user interface 116. The notification is fully automated, wherein the user is notified with information about the detected condition. If done via telephone, an interactive automated system, such as a voice recognition system or a touch tone system, is used so that once contacted, the user may obtain additional information about the user item. Once notified, by pager for instance, the user may use the interactive system to issue control commands to NOC 102. For example, the user may command NOC 102 to disable the user item or to contact the authorities and provide them with location information of the user item. At the completion of the automatic response at block 520, the operation of notification system 100 returns to block 506 to continue to monitor the user item.

Although one specific method of operation has been provided, it will be apparent to those with skill in the art that the responses R1-R3 described with reference to FIG. 5 can be combined and/or re-ordered without deviating from the scope of the present invention and that other responses using other capabilities of the system are possible.

Figure 6:
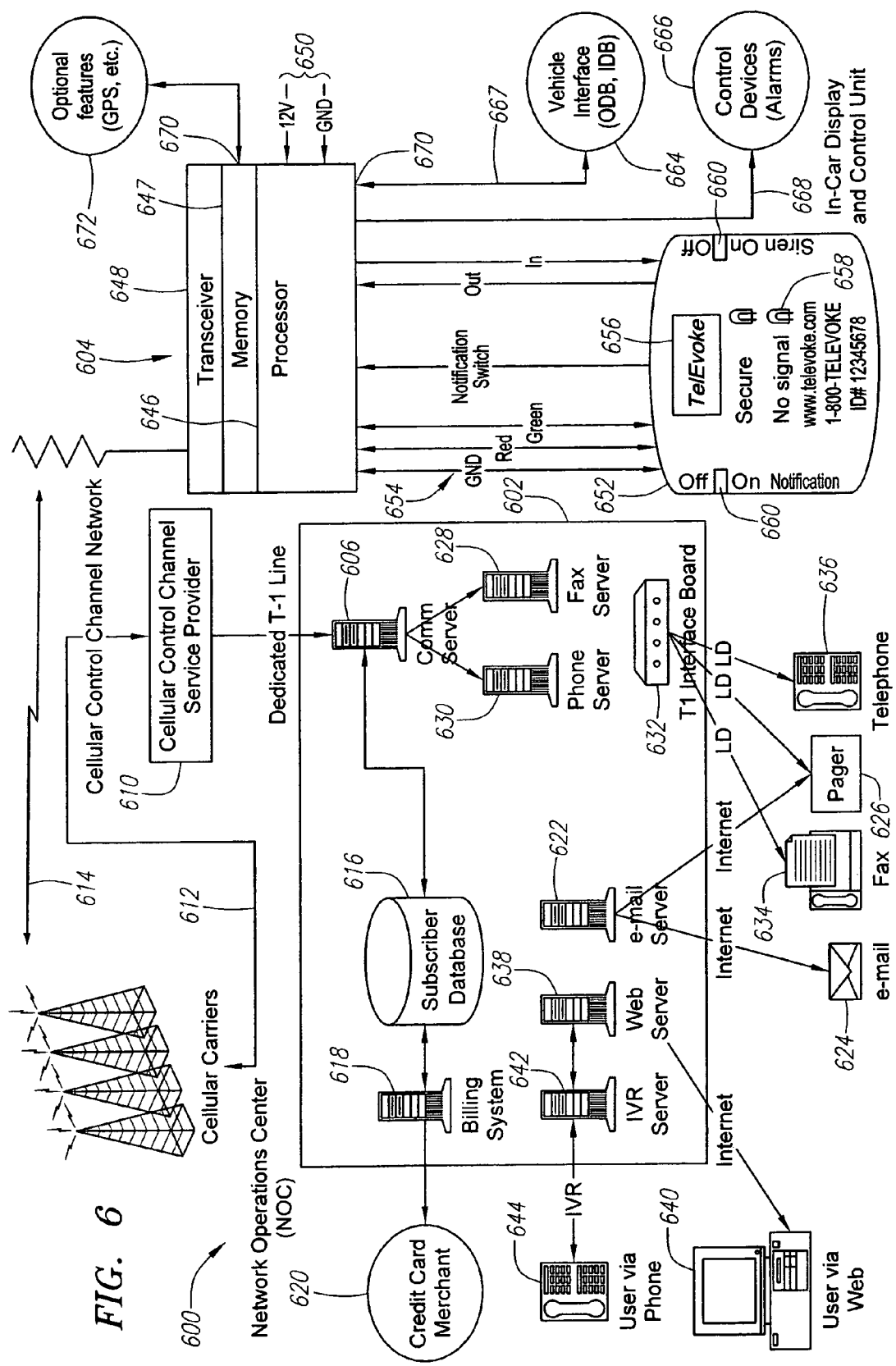
FIG. 6 is a detailed diagram of an embodiment of the present invention used to monitor conditions of a user vehicle.

FIG. 6 shows detailed embodiment 600 of the present invention used to monitor conditions of a user's vehicle. Embodiment 600 comprises NOC 602 and detector 604.

NOC 602 comprises a number of processors and servers to perform various processing functions and user interface functions. Communication server 606 is shown coupled to dedicated T-1 line 608, which is further coupled to cellular control channel service provider 610. Cellular control channel service provider 610 provides access to cellular control channel network 612. Communication server 606 communicates with detector 604 over communications link 614, which is part of cellular control channel network 612.

NOC 602 also comprises subscriber database 616, which is used to store operating parameters, vehicle information, and user contact information. Billing processor 618, coupled to subscriber database 616, generates invoices to users based on services rendered by NOC 602. For example, a daily fee may be billed. The billing processor has access to credit card process 620 to directly bill the user's credit card account. However, other types of billing processes, such as simply sending invoices directly to users, are possible.

Communication server 606 is coupled to email server 622 so that communication server 606 can notify users of detected conditions using email process 624 or pager service 626. Communication server 606 is also coupled to Fax server 628 and phone server 630 that are in turn coupled to T1 interface 632, so that communication server 606 can contact users with standard Fax 634 and telephone 636 services, or optionally, direct access to the pager service 626.

Web server 638 provides users a way to interact with NOC 602 using standard computer 640 connected to the Internet. Web server 638 is coupled to billing system 618, subscriber database 616 and communication server 606. Using the connection to Web server 638, users can control operation of the system, update operating parameters of the user item, change contact information or review user item status. Coupling billing system 618 to Web server 638 provides a way to invoice users for services rendered by NOC 602.

Intelligent voice recognition (IVR) server 642 is coupled to Web server 638 so that users may interact with NOC 602 using standard telephone 644. IVR 642 comprises a fully automated voice system that provides users access to all NOC 602 capability in a similar fashion to the Web access available to computer 640. Thus, NOC 602 provides a fully functional control and notification system that can automatically notify users via one or more notification devices and also provide users at least two methods of interaction wherein system operation can be controlled or monitored.

Detector 604 is mounted to the user's vehicle to monitor various conditions of the vehicle. For example, monitoring the state of the ignition switch, door locks, and windows will provide information to determine if the vehicle is being stolen or vandalized. Monitoring other states of the vehicle, such as if the airbags have been deployed, provides information to determine if the vehicle has been in an accident. Detector 604 comprises processor 646 to process vehicle information and transceiver 648 that allows detector 604 to communicate with NOC 602.

Power to detector 604 is provided by the vehicle's power system as shown at 650 but may also be supplied via a separate battery independent of the vehicle's power system. Local interface module 652 is connected to processor 646 to allow user interaction with detector 604. Local interface module 652 can be remotely located from processor 646 so that, for example, processor 646 can be mounted in the vehicle's trunk while local interface module 652 is mounted in the vehicle's passenger compartment. Local interface module 652 is connected to the processor via a number of interface connections 654 so that power and associated control and information signals may flow between processor 646 and local interface module 652. Local interface module 652 comprises display 656 which can display text or graphic information to the user. There are also indicators 658 on local interface module 652 to provide indications of basic conditions, for example, that the system is active or that a signal from NOC 602 is being received.

User input switches 660 provided on local interface module 652 allow a user to enter local commands to detector 604. For example, the user may use input switches 660 to enable and disable the audible alarm feature. Alternatively, a keypad (not shown) could be provided by local interface module 652, thereby allowing the user to enter more complicated instructions to detector 604. Additionally, commands entered at local interface module 652 may flow to processor 646 and be transmitted by transceiver 648 to NOC 602, thus providing the user another way to interact with NOC 602 to control the operation of the system. In response to a command received from detector 604, NOC 602 may transmit information back to detector 604 which can then be displayed by local interface module 652.

A set of detector connections 662 monitor the vehicle's condition and connect processor 646 to various systems and devices 664 of the user's vehicle. For example, detector connections 662 may connect processor 646 to the vehicle's ignition switch, battery, door locks, transmission or safety features such as seat belt or air bag systems. This allows processor 646 to determine conditions of the vehicle while detector 604 is activated. Processor 646 is further coupled to one or more control devices 666 by control lines 668. When processor 646 detects one or more alarm conditions, processor 646 uses control devices 666 to respond to the condition. For example, if an attempt to steal the vehicle is detected, processor 646 disables the vehicle ignition system by activating one or more of control devices 666 via control lines 668. Additionally, other control devices such as audible or visual alarm devices may be activated by processor 646 to further protect the vehicle from theft.

Processor 646 has one or more interface ports 670 to connect to external devices 672 (such as a GPS receiver) or to other information systems (such as an IDB system or an ODB system). Processor 646 interacts with the external devices and systems to obtain information and transmit the information to NOC 602. For example, positioning information in the form of latitude and longitude coordinates obtained from the GPS receiver can be transmitted to NOC 602. Once NOC 602 receives the coordinates sent via the chosen transmission media, reverse geocoding utilizing map data bases can be used to extract the closest street address or intersection based on the received set of coordinates. The locational information can be retrieved by the user in a number of ways. For example, the location of the user's vehicle can be shown on a viewable map via the Web or a different medium. Alternately, if the user is communicating to the NOC via a telephone or other means which prevents delivery of visual information, the street address or the closest intersection obtained via reverse geocoding is delivered to the user in a human intelligible audio speech format using a text to speech engine.

FIG. 7 shows list 700 of detectable conditions in an exemplary vehicle monitoring embodiment of the present invention. Each condition 702 has associated ID numbers 704 that can be used to identify the respective vehicle condition. ID numbers 704 are used by both the NOC and the detector(s) to reference specific monitored conditions. It will be apparent that the list is representative and not intended to show all possible conditions that can be monitored by the embodiments of the present invention.

FIG. 8 shows an item database containing information used to configure a detector to interface with a user vehicle. Detector interface type 802 is associated with vehicle device 804. For example, the detector's parallel port 806 is associated with GPS tracking device 808. Many of the vehicle's devices are accessed via internal information systems, such as the Intelligent Data Bus (IDB) system. For example, information about the doors, windows, sunroof and truck can be obtained from the IDB system. The detector associates item database 800 with detectable conditions list 700 so that the detector can access the appropriate device to determine selected conditions.

Figure 9D:

FIGS. 9A-9E illustrate web pages available for user interaction via the Internet. FIG. 9A illustrates a login page 900 where a user enters a device number 902 of the monitored device and a special user passcode 904 for security purposes. FIG. 9B illustrates notification page 910, where a user can enter various contact information. For example, selection of communication device 912, contact number 914 and message 916 are possible. FIG. 9C illustrates control page 920, where the user may control various control functions of the user item being monitored. For example, control function 922 allows the doors to be locked or unlocked. Control function 924 allows the windows to be moved up or down.

FIG. 9D illustrates tracking page 930, where the position of a vehicle may be tracked. Map 932 of a region is shown together with indicator 934 (in this embodiment, a star) which indicates the vehicle's position. FIG. 9E illustrates billing page 940, where the user may see charges that have accrued for the services rendered by automated system 100. For example, specific events are shown in field 942 along with event types in field 944. The date and the time the event occurred are shown in date field 946 and time field 948, respectively. The corresponding charges are shown in charge field 950, thereby providing the user with a detailed summary of charges based on system usage.

It will be obvious to those of skill in the art that other web pages are possible for use in interacting with users of the automated system 100 without deviating from the scope of the present invention. For example, web pages which provide user support information or upgrade information are also possible.

FIG. 10 lists some exemplary downstream message codes which are appropriate for remote vehicle tracking and control. For the purposes of this disclosure, "downstream" messages are those sent by a user. Function field 1005 indicates various categories of messages which a user may wish to send. Message name field 1010 indicates the message names for particular commands and code field 1015 indicates the codes which correspond to each message name. For example, a user may wish to use a remote vehicle tracking function. One option for obtaining information about a vehicle's location is to select message 1012, "D_Get_Last_8_Pos_5_min," which corresponds to code 1017, "WC3."

Figure 11:
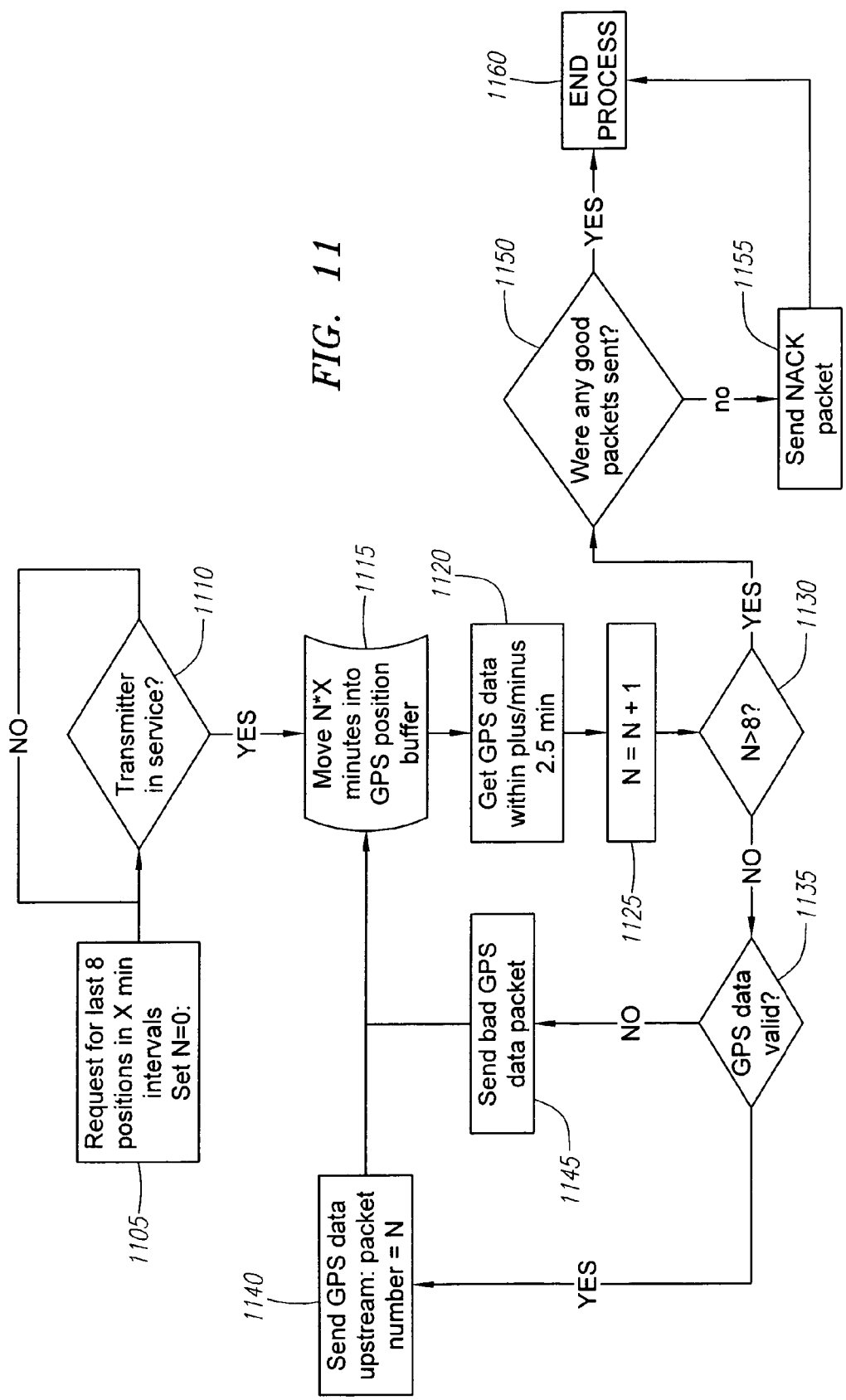
FIG. 11 is a flow chart indicating a response to a downstream message code.

FIG. 11 indicates an exemplary routine which a remote device (such as detector 604 of FIG. 6) executes upon receipt of code WC3. In step 1105, detector 604 receives code WC3 and processor 646 interprets the code as a request for the last 8 positions in X minute intervals. In this instance, X=5 . Processor 646 sets the value of N, the data packet number, to zero. In step 1110, processor 646 determines whether transceiver 648 can transmit a data packet. After verifying that transceiver 648 is in service, the routine continues to step 1115, wherein a GPS position at time N*X minutes is determined. In this example, N=0, so processor 646 determines that the current GPS position is desired.

In this embodiment, detector 604 includes GPS device 672 and processor 646 includes memory 647, which serves as a buffer for GPS device 672. In step 1120, processor 646 determines whether the current GPS position is available in memory 647. If not, processor 646 determines whether there is a GPS position in memory 647 which corresponds to a within +/−2.5 minutes of the current time.

In step 1125, processor 646 increments N by one unit: here, N is increased from 0 to 1. In step 1130, processor 646 determines that N is not greater than 8, the total number of positions requested by the user, and therefore proceeds to step 1135. At this time, processor 646 determines whether the GPS data are valid. If the GPS data are valid, the routine proceeds to step 1140 and the GPS data are sent to the user. If the GPS data are not valid, the routine proceeds to step 1145 and the bad GPS data are sent to the user, preferably in a form which indicates that the data are invalid. In one embodiment, latitude and longitude values of 99.99.99 indicate that the GPS data are invalid.

The routine then proceeds through steps 1115 through 1140 (or through 1145 if invalid GPS data are reported) until processor 646 determines that N>8 in step 1130. If N>8, the routine proceeds to step 1150, wherein processor 646 determines whether any valid GPS data packets were sent. If any valid GPS data packets were sent, the routine proceeds to step 1160 and the process ends. If no valid GPS data packets were sent, the routine proceeds to step 1155 and a "NACK" packet is sent. A "NACK" packet is a negative acknowledgement packet and is the opposite of an "ACK" packet, which would indicate that detector 604 has successfully executed the user's command. The routine then proceeds to step 1160 and terminates.

Data Formats for Upstream Data

FIG. 12 indicates one embodiment of a data format for upstream data according to the present invention. In this disclosure, "upstream" means originating from a remote device, such as any one of detectors 104, 106, 108, 110 or 604. In the preferred embodiment depicted in FIG. 12 and discussed below, the upstream data packets are constrained to a maximum of 15 digits. In the preferred embodiment as shown in Table 1, the upstream messages comprise of a 15-digit word. Each digit is a 4-bit nibble of range 1 to A (Hex). The physical value A (Hex) will be a logical zero.

However, one of skill in the art will appreciate that various communication systems will have different protocols and different constraints on the size of upstream data packets. Therefore, the following descriptions of exemplary data formats should be understood as examples within the scope of the present invention and not as limitations of any kind.

Digit field 1205 of FIG. 12 indicates the position of data within a data packet, which in this example is a series of 15 digits. Content fields 1210 indicate the type of data which will be assigned to the digits in digit field 1205. In this example, content field 1215 indicates an alarm event and/or speed and is associated with digits 1 and 2. Content field 1220 indicates direction and is associated with digit 3. Content field 1225 indicates longitude data and is associated with digits 4 through 9. Finally, content field 1230 indicates latitude data and is associated with digits 10 through 15.

FIG. 13 illustrates a preferred embodiment of a direction code which may be used in the numerical field corresponding to content field 1220 of FIG. 12. The direction codes correspond to the primary compass points and 45 degree increments. The North compass point is mapped to a value of "A," NE is mapped to 1 and so on. A value of 8 indicates that the vehicle has stopped. This is because there is no direction or motion associated with a stopped vehicle.

Grouping more than one type of data in the same content field is a particular advantage of the present invention. For example, FIG. 14 indicates a preferred embodiment for combining alarm events and speed codes into two digits of the upstream data packet. These two digits correspond to content field 1215 of FIG. 12. If only one digit were assigned to alarm event data, a maximum of 10 alarm events could be encoded. On the other hand, it is not necessary to provide 99 different alarm codes. Combining speed information and alarm information into a single two-digit code allows more information to be encoded into data packets than if either 1 or 2 digits were assigned only to alarm event data.

In the embodiment shown in FIG. 14, reference section 1405 indicates a general category for the upstream data packet. For example, a particular entry in reference section 1405 may correspond to remote vehicle tracking or to remote vehicle control. Field 1410 indicates the message name of an upstream data packet. As explained in more detail below, these named messages may be generated in response to a downstream message code or in response to the activation of a sensor. For example, the upstream message name "U_Last_ 8_Stops_Pos" would be responsive to the downstream message "D_Get_Last_8_Stops" shown in message name field 1010 of FIG. 10. The upstream message name "U_Sensor_A" would be response to the activation of a sensor in the remote device which had been designated as Sensor A.

In this embodiment, alarm event and speed code field 1415 consists of four possible values for each message name 1410. Any of the values in column 1420 correspond with speed code SP1, which indicates that the vehicle is moving at a speed between 6 and 25 MPH. Any of the values in column 1425 correspond with speed code SP2, which indicates that the vehicle is moving at a speed between 26 and 50 MPH. Any of the values in column 1430 correspond with speed code SP3, which indicates that the vehicle is moving at a speed between 51 and 75 MPH. Finally, any of the values in column 1440 correspond with speed code SP4, which indicates that the vehicle is moving at a speed of 76 MPH or more. For example, a value of "04" in alarm event and speed code field 1415 indicates that the vehicle's trunk sensor has been activated (probably indicating that the trunk has been opened) and that the vehicle is traveling at between 5 and 25 MPH.

Various alternative data formats may advantageously be used. For example, for upstream data packets which are responsive to message 1012 of FIG. 10 ("D_Get_Last_ 8_Pos_5_min," the response to which was discussed with reference to FIG. 11), speed and direction need not be reported because these values are evident from the sequential position values reported to the user. Therefore, it is advantageous to use content field 1215 to indicate an unique identifier number and to use content field 1220 to indicate a sequence number, which is the value of "N" in FIG. 11. The corresponding data format is set forth below:

| | |
|---|---|
| D1, D2 = | 1, 1 |
| D3 = | sequence number 1, 2, . . . 8 |
| D4-9 = | dd.mm.mm longitude |
| D10-D15 = | dd.mm.mm latitude |

Other data formats which correspond to various downstream commands are set forth below.

"U_1_Hour_Pos"

This message name indicates that the user has asked for the last 8 positions of a vehicle. The spacing between the reporting times is 1 hour. As in the previous example, speed and direction need not be reported, as these are self evident from the distances between the sequential locations reported. The upstream data packet is only required to provide information on the locations. In order to preserve information regarding the sequence of upstream data packets, each upstream data packet includes a sequence number in the data packet so that the network operations center can re-create the transmission order of the messages sent. The following shows an exemplary format of upstream data packets:

| | |
|---|---|
| D1, D2 = | 1, 2 (unique identifier) |
| D3 = | sequence number 1, 2, . . . 8 |
| D4-9 = | dd.mm.mm longitude |
| D10-D15 = | dd.mm.mm latitude |

"U_Last_Stops_Pos" Command

Here, the user has requested information regarding the last 8 times a vehicle has stopped. The time frame of the report is assumed to be a 24 hour period. Only relevant packets will be transmitted. For example, if the vehicle has stopped 20 times in the last 24 hours, the system will report the last 8 stops. The default value for a "stop" is a condition in which the vehicle's ignition has been turned off for more than 5 minutes. If the vehicle has stopped only 2 times in the last 24 hours, the system will report only the last 2 stops. The number of packets to be reported will be indicated by the sequence numbers encoded in the data packet. The last report will always have sequence number 8.

For example:

| Number of Positions to Report | Sequence Numbers Used |
|---|---|
| 1 | 8 |
| 3 | 6, 7, 8 |
| 8 | 1, 2, 3, 4, 5, 6, 7, 8 |

Following is an advantageous format for upstream data packets corresponding to the "U_Last_Stops_Pos" message name:

| | |
|---|---|
| D1, D2 = | 1, 3 |
| D3 = | sequence number 1, 2, . . . 8 |
| D4-9 = | dd.mm.mm longitude |
| D10-15 = | dd.mm.mm latitude |

"U_Stops_1_6_Time" and "U_Stops_7_8_Time" message names

The data format above does not include time information. However, a user may wish to know the times corresponding with the reported positions. Therefore, a "U_Stops_1_6_Time" or a "U_Stops_7_8_Time" upstream data packet is transmitted in connection with the foregoing data packets. A "U_Stops_1_6_Time" data packet includes time data for each of the last 6 locations reported where the vehicle has stopped. If there are more than 6 stops to report, a "U_Stops_7_8_Time" upstream data packet is transmitted. Time will be reported in quarter hour increments starting from midnight. For example, 3:30 a.m.=7×15 minutes from midnight and will be reported as "07."

Exemplary Format for a "U_Stops_1_6_Time" Data Packet

| | |
|---|---|
| D1, D2 = | 1, 4 (identifier) |
| D3, D4 = | Time for Sequence #1 |
| D5, D6 = | Time for Sequence #2 |
| D7, D8 = | Time for Sequence #3 |
| D9, D10 = | Time for Sequence #4 |
| D11, D12 = | Time for Sequence #5 |
| D13, D14 = | Time for Sequence #6 |

Exemplary Format for a "U_Stops_7_8_Time" Data Packet

| | |
|---|---|
| D1, D2 =- | 1, 5 |
| D3, D4 = | Time for Sequence #7 |
| D5, D6 = | Time for Sequence #8 |

Figure 15:
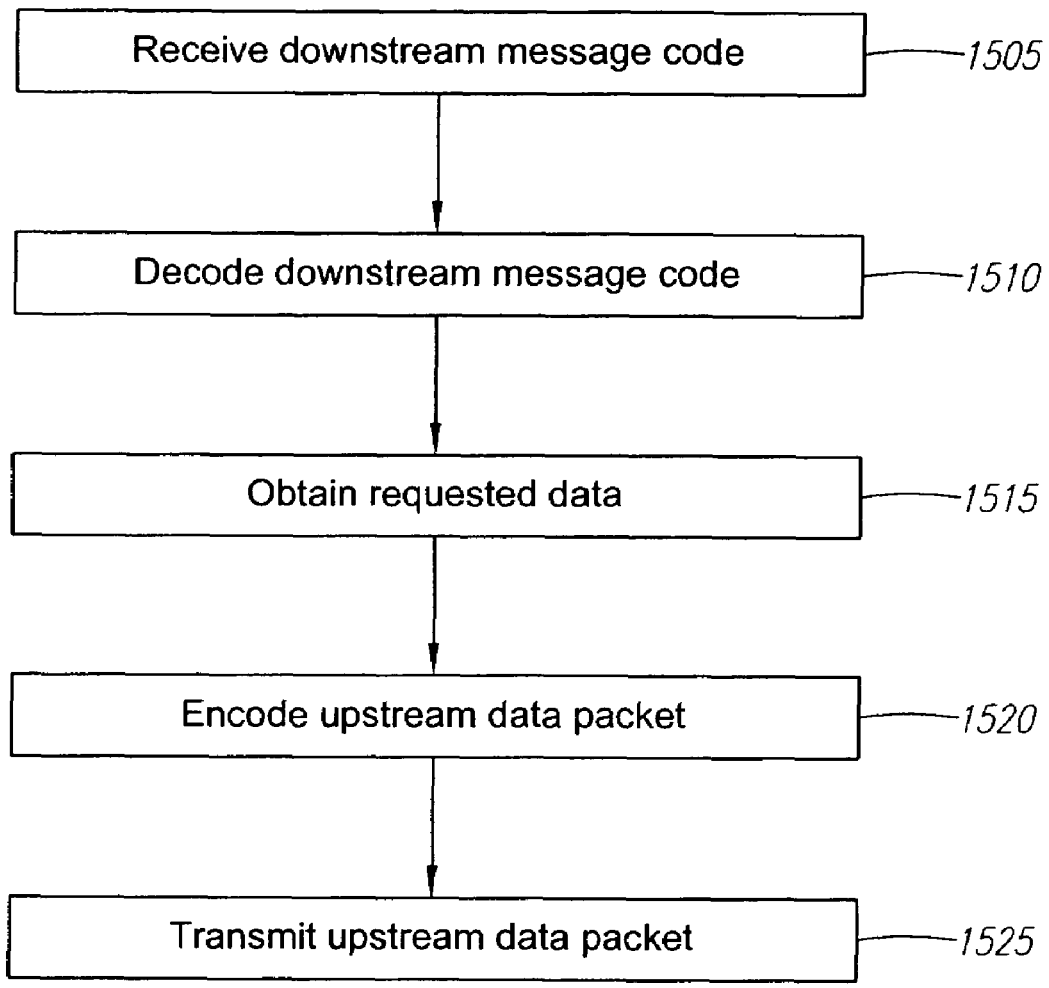
FIG. 15 is a flow chart which illustrates one embodiment of a method according to the present invention.

FIG. 15 is a flow chart which illustrates one embodiment of an exemplary method according to the present invention for employing the foregoing message codes and data packet formats. The method depicted in FIG. 15 will be explained with reference to the embodiment depicted in FIG. 6, but the general features of the method are applicable to many embodiments of the present invention.

In this embodiment, a downstream message code is received at step 1505. For example, the message code could be any of the codes indicated in code field 1015. In this embodiment, the downstream message code is received by transceiver 648; in other embodiments, the downstream message code is received by the receiver or transceiver used in the corresponding embodiment. Moreover, the process of obtaining data, encoding a data packet and transmitting the data packet are not always initiated by the receipt of a downstream message code. For example, this process can be automatically initiated by the detection of a change in status of a user item (e.g., the detection of a vehicle's window being broken).

In step 1510, processor 646 decodes the downstream message code and determines what data need to be obtained in response to the downstream message code. For example, processor 646 may decode the downstream message code by reference to a "look-up table" stored in memory 647.

At step 1515, processor 646 obtains the requested data. For example, processor 646 may poll control devices 666, systems and devices 664 and/or external devices 672. Alternatively, processor may simply search in memory 647 for data which have already been received by the foregoing devices.

At step 1520, processor encodes an upstream data packet with part or all of the data responsive to the downstream message code. The upstream data packet may be encoded in any of the ways discussed in the foregoing examples or in any other convenient manner. The encoding process will be determined, in part, by the type of data which need to be encoded and the maximum size of the data packet.

In step 1525, transceiver 648 transmits the upstream data packet. In this example, the upstream data packet is transmitted to NOC 602 over communications link 614, which is part of cellular control channel network 612.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A method of notifying a user of an occurrence of an event associated with a user item, the method comprising the steps of:
   receiving a set of notification instructions;
   automatically detecting the occurrence of the event;
   encoding a data packet with event data, the data packet comprising a plurality of content fields, wherein at least one content field comprises a plurality of event data types;
   transmitting the data packet over a communication link to an automated network operations center;
   receiving the data packet at the automated network operations center;
   decoding the data packet;
   making an automatic determination, based in part upon the decoded event data and upon the set of notification instructions, whether the user should be notified of the event; and
   automatically notifying the user of the event if the determination is that the user should be notified.

2. The method of claim 1, wherein the event corresponds to a condition of the user item.

3. The method of claim 1, wherein the detecting step further comprises the step of polling the user item.

4. The method of claim 1, wherein the detecting step is responsive to a request.

5. The method of claim 1, wherein the set of notification instructions is input to the automated network operations center.

6. The method of claim 1, wherein the set of notification instructions comprises a notification sequence.

7. The method of claim 1, wherein the set of notification instructions comprises the selection of at least one of a plurality of notification devices.

8. The method of claim 1, wherein the detecting step comprises the step of receiving user item location information from a GPS receiver.

9. The method of claim 1, wherein the automatic notification step further comprises the step of providing a user item location.

10. The method of claim 1, further comprising a step of automatically performing an action upon the user item in response to the occurrence of the event, wherein the step of automatically performing the action is controlled by the automated network operations center.

11. The method of claim 1, further comprising a step of receiving a user item control command.

12. The method of claim 1, wherein the content field which comprises a plurality of event data types occupies approximately one byte of the data packet.

13. The method of claim 1, wherein the content field which comprises a plurality of event data types occupies two digits of the data packet.

14. The method of claim 2, wherein the user item is selected from the group consisting of vehicles, residential property, commercial property, and personal items.

15. The method of claim 5, wherein the inputting step is performed via a public information network.

16. The method of claim 5, wherein the inputting step is performed via a telephone.

17. The method of claim 5, wherein the inputting step is performed via a keypad corresponding to the telephone.

18. The method of claim 5, wherein the inputting step is performed via a telephone utilizing voice input and wherein the automated network operations center comprises a voice recognition system.

19. The method of claim 7, wherein the plurality of notification devices is selected from the group consisting of facsimile machines, telephones, pagers, electronic mail, and a public information network interface.

20. The method of claim 11, further comprising a step of controlling the user item according to the user item control command.

21. The method of claim 13, wherein the public information network is the Internet.

22. An apparatus of notifying a user of an occurrence of an event associated with a user item, the apparatus comprising:
   means for receiving a set of notification instructions;
   means for automatically detecting the occurrence of the event;
   means for encoding a data packet with event data, the data packet comprising a plurality of content fields, wherein at least one content field comprises a plurality of event data types;
   means for transmitting the data packet over a communication link to an automated network operations center;
   means for receiving the data packet at the automated network operations center;
   means for decoding the data packet;
   means for making an automatic determination, based in part upon the decoded event data and upon the set of notification instructions, whether the user should be notified of the event; and
   means for automatically notifying the user of the event if the determination is that the user should be notified.

23. The apparatus of claim 22, wherein the event corresponds to a condition of the user item.

24. The apparatus of claim 22, wherein the detecting means comprises means for polling the user item.

25. The apparatus of claim 22, wherein the detecting means is responsive to a request for detection.

26. The apparatus of claim 22, wherein the receiving means comprises means for receiving a set of notification instructions input to the automated network operations center.

27. The apparatus of claim 22, wherein the set of notification instructions comprises a notification sequence.

28. The apparatus of claim 22, wherein the set of notification instructions comprises the selection of at least one of a plurality of notification devices.

29. The apparatus of claim 22, wherein the detecting means comprises means for receiving user item location information from a GPS receiver.

30. The apparatus of claim 22, wherein the automatic notification means comprises means for providing a user item location.

31. The apparatus of claim 25, further comprising means for automatically performing an action upon the user item in response to the occurrence of the event, wherein the step of automatically performing the action is controlled by the automated network operations center.

32. The apparatus of claim 22, wherein the receiving means comprises means for receiving a user item control command.

33. The apparatus of claim 22, wherein the content field which comprises a plurality of event data types occupies approximately one byte of the data packet.

34. The apparatus of claim 22, wherein the content field which comprises a plurality of event data types occupies two digits of the data packet.

35. The apparatus of claim 23, wherein the user item is selected from the group consisting of vehicles, residential property, commercial property, and personal items.

36. The apparatus of claim 26, wherein the notification instructions are input via a public information network.

37. The apparatus of claim 26, wherein the notification instructions are input via a telephone.

38. The apparatus of claim 26, wherein the notification instructions are input via a keypad corresponding to the telephone.

39. The apparatus of claim 26, wherein the notification instructions are input via a telephone utilizing voice input and wherein the automated network operations center comprises a voice recognition system.

40. The apparatus of claim 26, wherein the plurality of notification devices is selected from the group consisting of facsimile machines, telephones, pagers, electronic mail, and a public information network interface.

41. The apparatus of claim 32, further comprising means for controlling the user item according to the user item control command.

42. The apparatus of claim 34, wherein the public information network is the Internet.

* * * * *

UNITED STATES PATENT AND TRADEMARK OFFICE
CERTIFICATE OF CORRECTION

PATENT NO.       : 7,489,921 B2                                        Page 1 of 1
APPLICATION NO.  : 11/034675
DATED            : February 10, 2009
INVENTOR(S)      : Steven Bristow et al.

It is certified that error appears in the above-identified patent and that said Letters Patent is hereby corrected as shown below:

Column 22, Claim 40, Line 52, please change -- 26 -- to "28".

Signed and Sealed this

Fifth Day of May, 2009

JOHN DOLL
*Acting Director of the United States Patent and Trademark Office*